United States Patent
Stawski

(10) Patent No.: US 11,655,018 B2
(45) Date of Patent: May 23, 2023

(54) PERMEABLE RADIUS FILLER FOR COMPOSITE STRUCTURE

(71) Applicant: The Boeing Company, Chicago, IL (US)

(72) Inventor: Stanley Stawski, Camano Island, WA (US)

(73) Assignee: The Boeing Company, Arlington, VA (US)

( * ) Notice: Subject to any disclaimer, the term of this patent is extended or adjusted under 35 U.S.C. 154(b) by 339 days.

(21) Appl. No.: 16/521,557

(22) Filed: Jul. 24, 2019

(65) Prior Publication Data

US 2021/0023798 A1 Jan. 28, 2021

(51) Int. Cl.
| | |
|---|---|
| *B29C 70/06* | (2006.01) |
| *B29C 70/40* | (2006.01) |
| *B29C 70/74* | (2006.01) |
| *B29D 99/00* | (2010.01) |
| *B29K 105/08* | (2006.01) |
| *B29K 105/16* | (2006.01) |
| *B32B 5/26* | (2006.01) |
| *B64C 1/06* | (2006.01) |
| *B64C 3/18* | (2006.01) |
| *B32B 27/08* | (2006.01) |

(Continued)

(52) U.S. Cl.
CPC .............. *B64C 1/064* (2013.01); *B29C 70/06* (2013.01); *B29C 70/40* (2013.01); *B29C 70/745* (2013.01); *B29D 99/001* (2013.01); *B29D 99/0005* (2021.05); *B32B 5/26* (2013.01); *B32B 27/08* (2013.01); *B64C 3/182* (2013.01); *B29K 2105/0872* (2013.01); *B29K 2105/16* (2013.01); *B29K 2307/04* (2013.01); *B29L 2031/3085* (2013.01); *B32B 2605/18* (2013.01)

(58) Field of Classification Search
CPC ....... B29C 70/06; B29C 70/745; B29C 70/00; B29C 70/30; B29C 70/40; B29C 70/44; B64C 1/064; B64C 3/182; B64C 1/065; B64C 2001/0072; Y02T 50/40; B32B 2260/023; B32B 2262/105; B32B 2262/106; B32B 2260/046; B32B 2262/103; B32B 2262/101; B32B 2262/14; B32B 5/024; B32B 3/08; B32B 5/26; B32B 27/08; B32B 2605/18; B29D 99/0005; B29D 99/001; B29L 2031/3085; B29K 2105/16; B29K 2307/04; B29K 2105/0872

See application file for complete search history.

(56) References Cited

U.S. PATENT DOCUMENTS 3,622,435 A * 11/1971 Cacella .................... B32B 5/18
428/297.4
9,463,864 B1 * 10/2016 McCarville ........ B29D 99/0007
(Continued)

*Primary Examiner* — Francisco W Tschen
*Assistant Examiner* — Elisa H Vera

(57) ABSTRACT

A method of manufacturing a cured composite structure includes placing a radius filler element into a radius cavity extending along a length of a composite base member. The radius filler element is formed of a permeable material. The method also includes absorbing resin from the composite base member into the permeable material of the radius filler element. The method additionally includes curing or solidifying the resin in the radius filler element and in the composite base member to form a cured composite structure in which the resin bonds the radius filler element to the composite base member.

22 Claims, 16 Drawing Sheets

(51) Int. Cl.
 *B29K 307/04* (2006.01)
 *B29L 31/30* (2006.01)

(56) References Cited

U.S. PATENT DOCUMENTS

| | | | | |
|---|---|---|---|---|
| 2002/0047224 | A1* | 4/2002 | McCollum | B29C 70/443 |
| | | | | 264/40.7 |
| 2004/0122133 | A1* | 6/2004 | Mohanty | B29C 48/05 |
| | | | | 524/35 |
| 2007/0138683 | A1* | 6/2007 | Kanie | B62D 29/002 |
| | | | | 425/112 |
| 2010/0291821 | A1* | 11/2010 | Kirchner | B32B 5/022 |
| | | | | 442/152 |
| 2015/0321444 | A1* | 11/2015 | Breu | C08J 3/24 |
| | | | | 428/121 |
| 2015/0360396 | A1 | 12/2015 | Thomas | |
| 2016/0279884 | A1* | 9/2016 | Cantwell | B29C 70/547 |
| 2016/0303902 | A1* | 10/2016 | Snyder | B29C 70/30 |
| 2016/0368226 | A1* | 12/2016 | Encinosa | B29C 65/02 |
| 2017/0190138 | A1* | 7/2017 | Goering | D03D 25/005 |
| 2020/0072414 | A1* | 3/2020 | Iida | F17C 1/16 |

\* cited by examiner

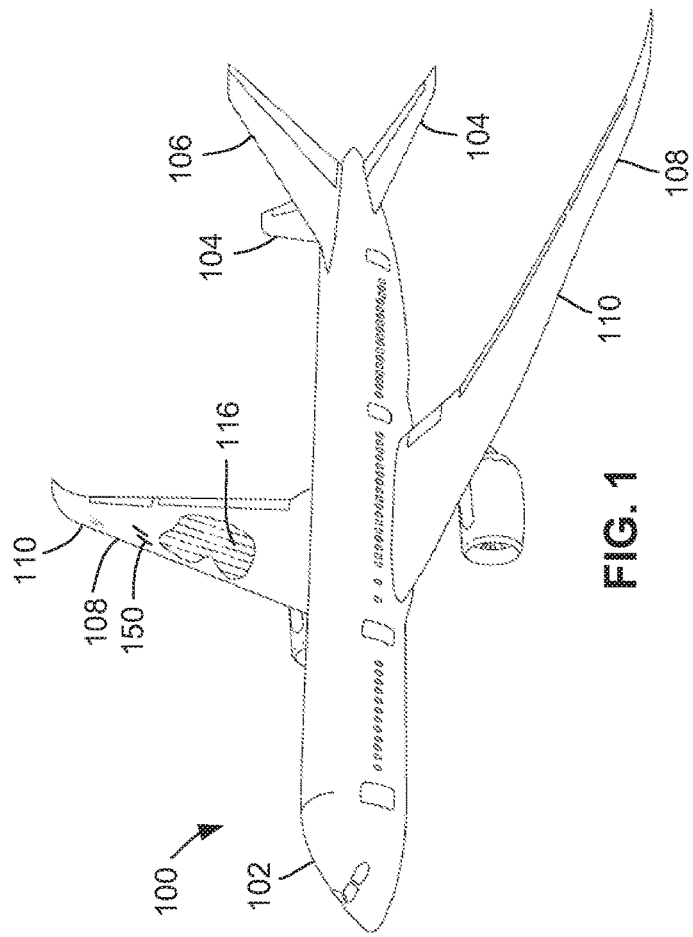
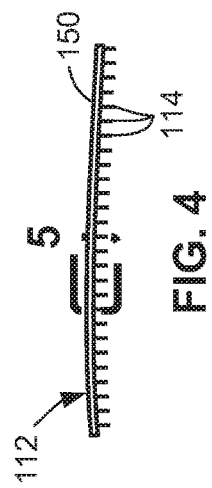
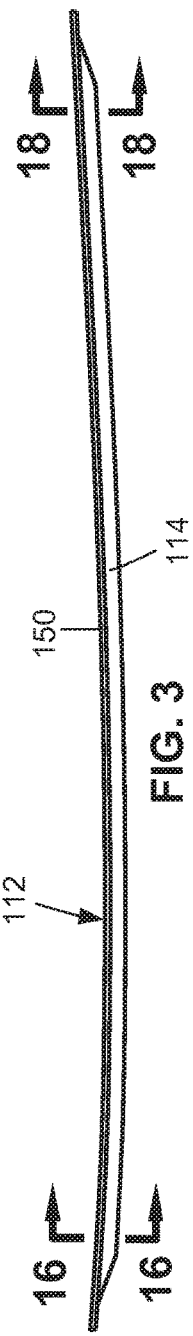
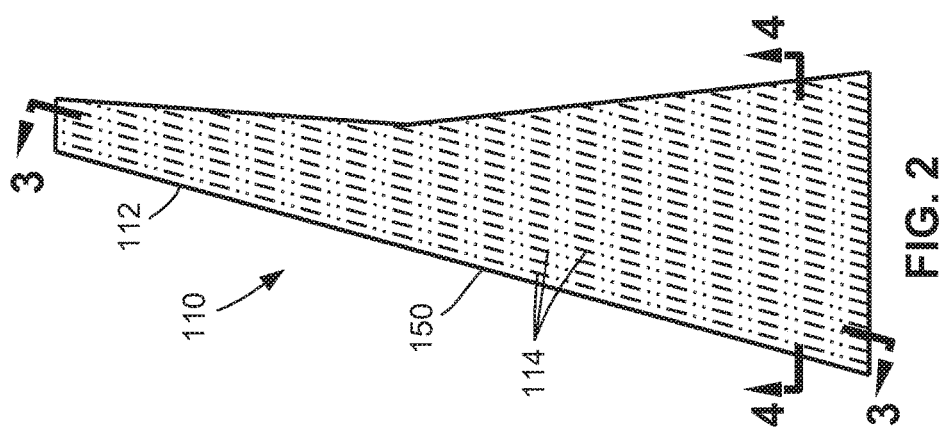

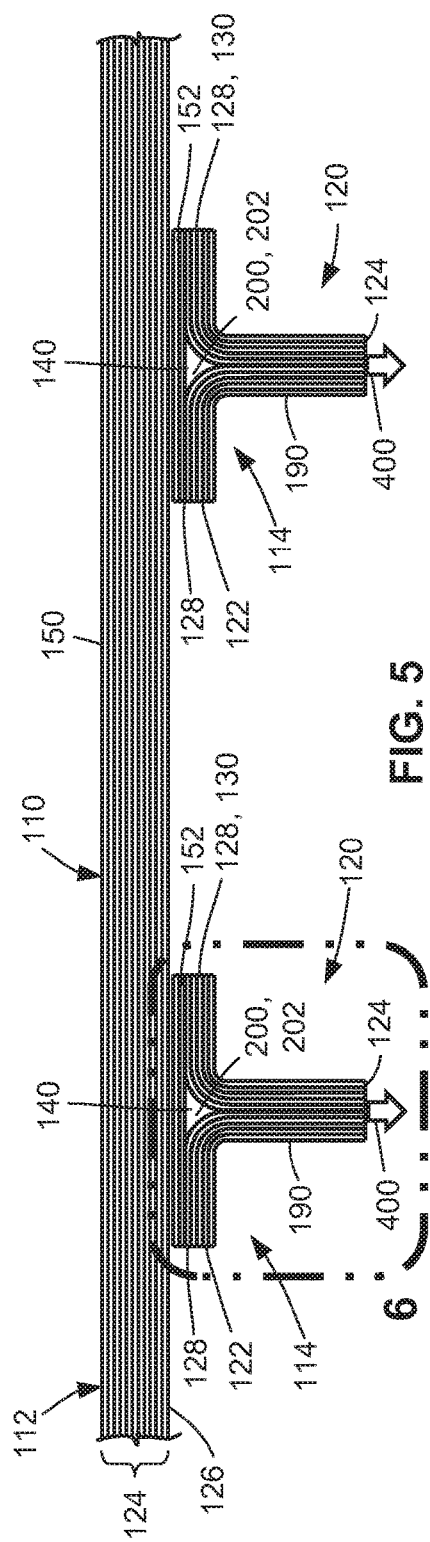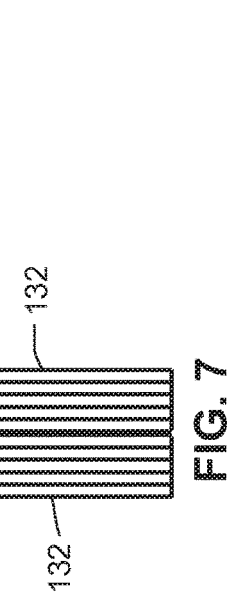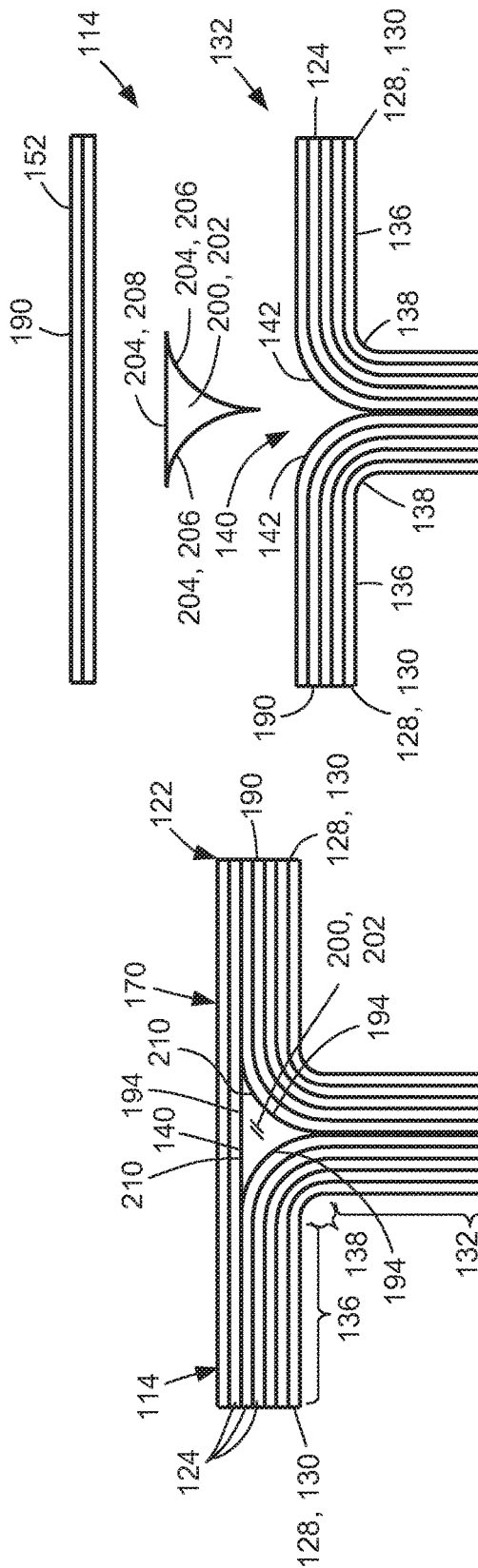

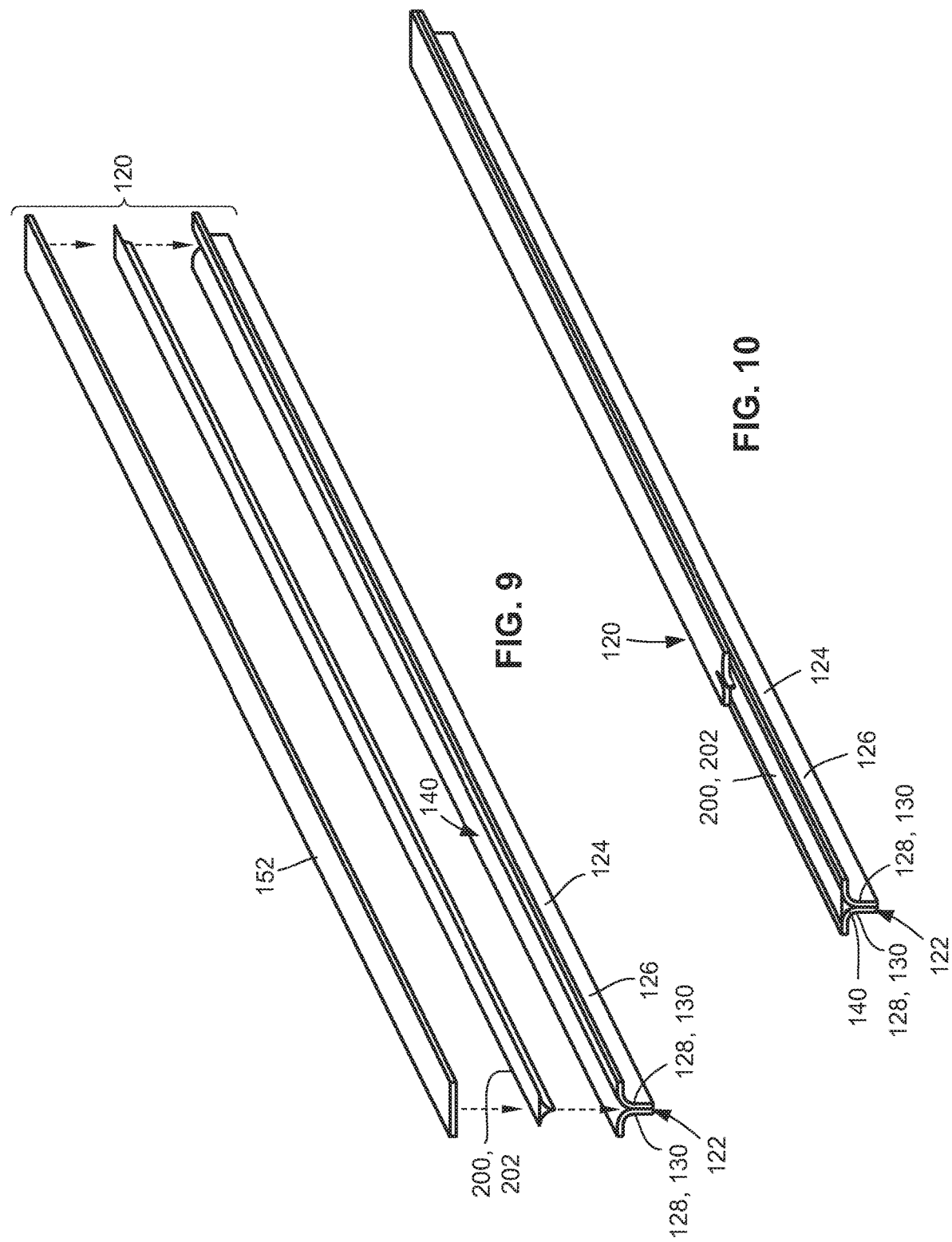

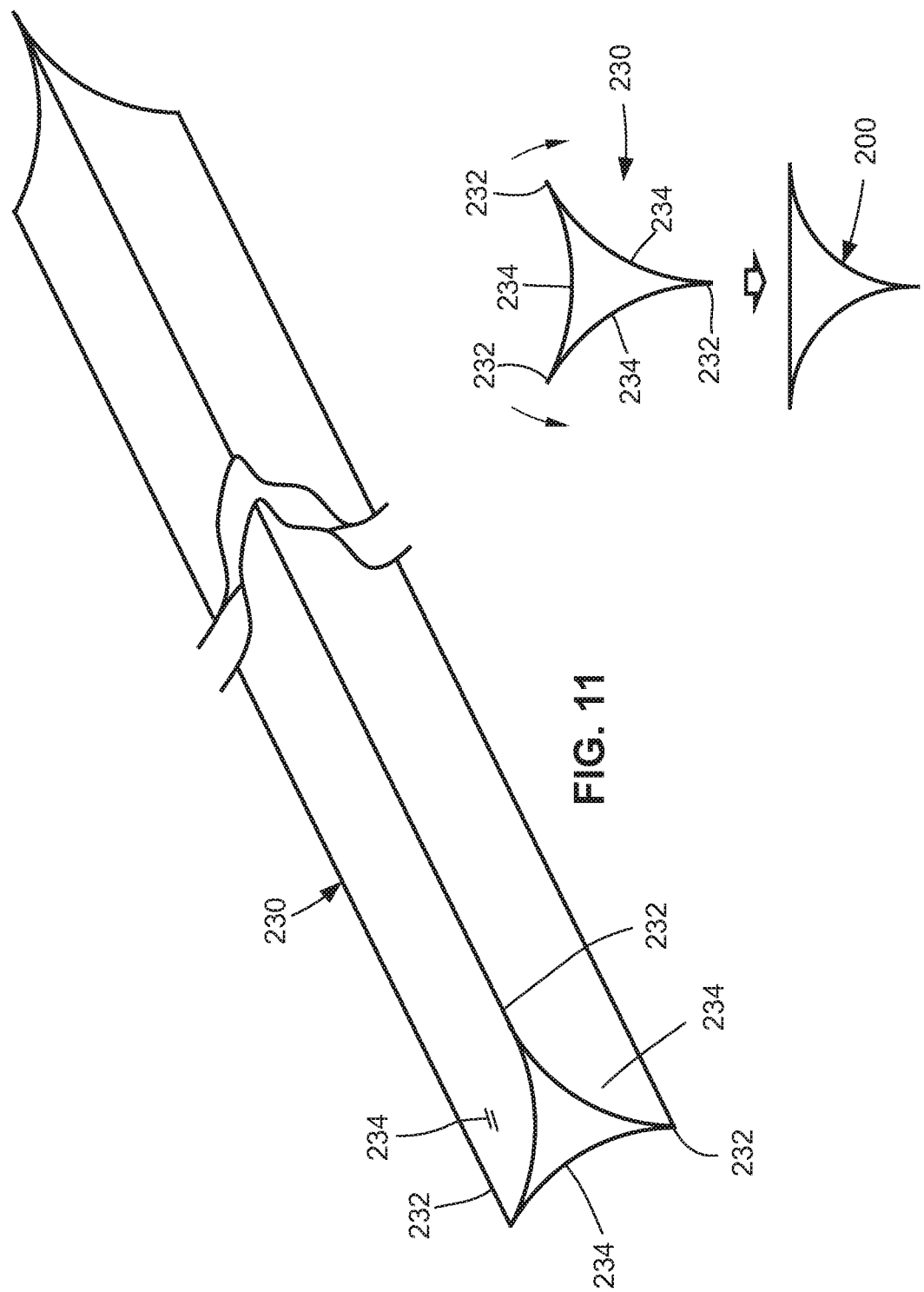

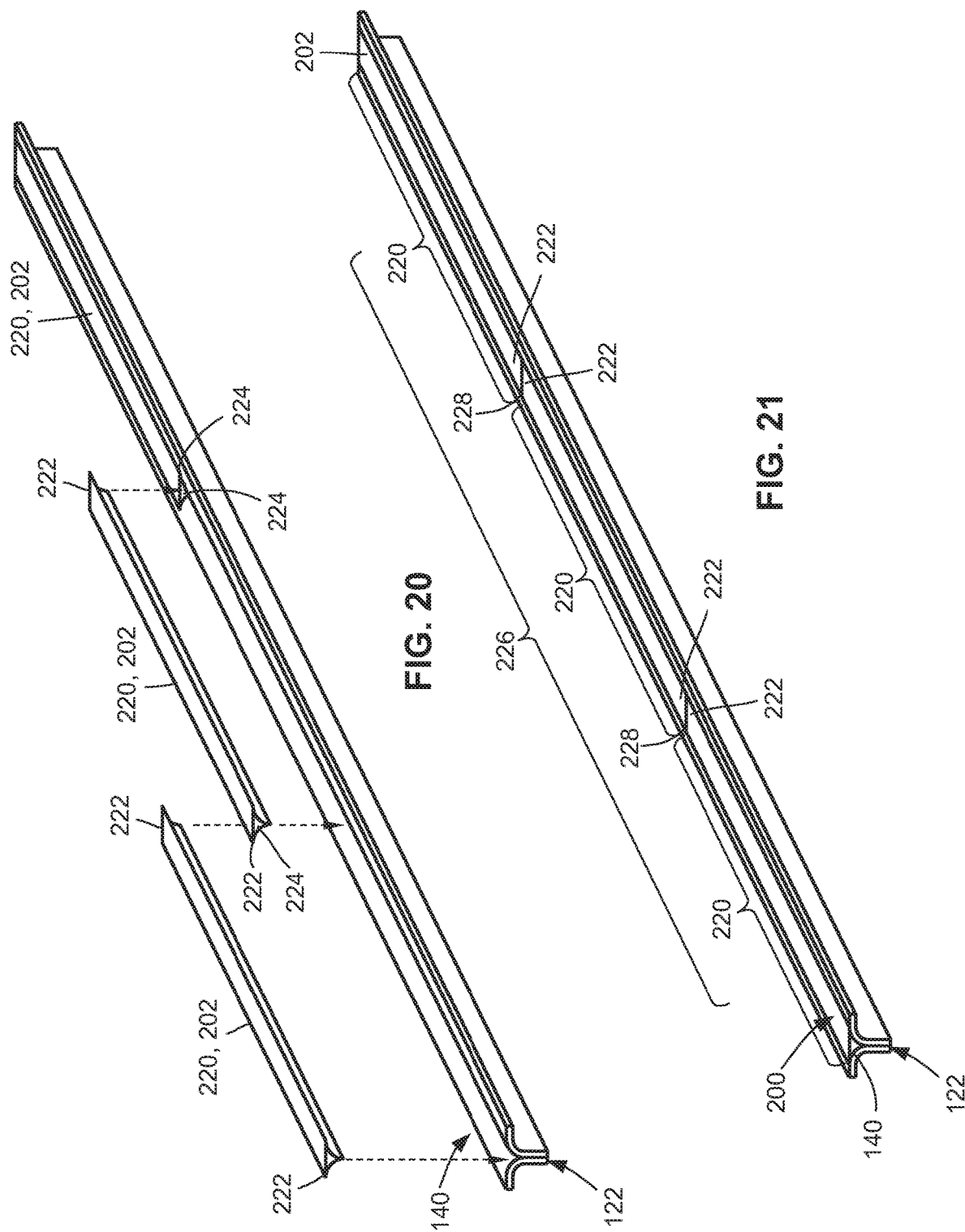

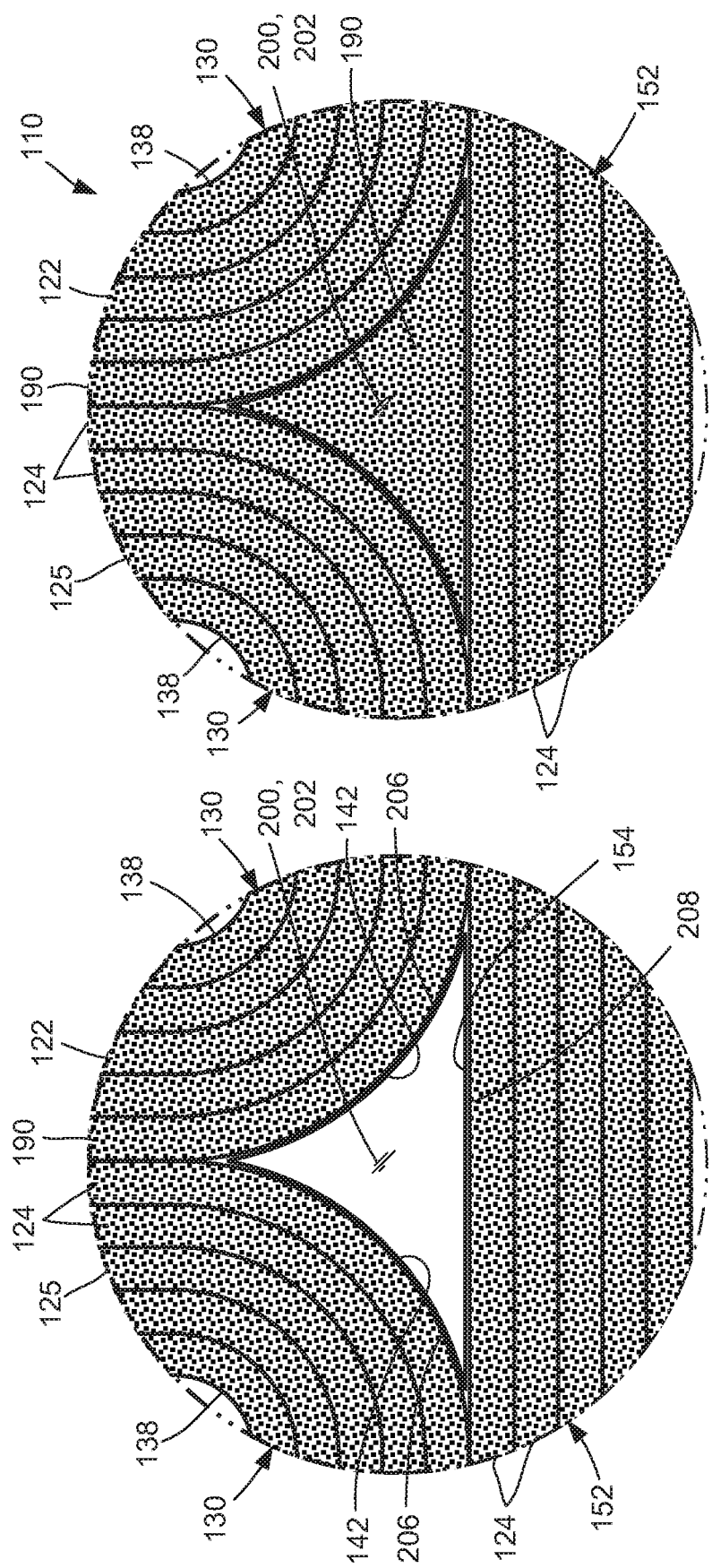

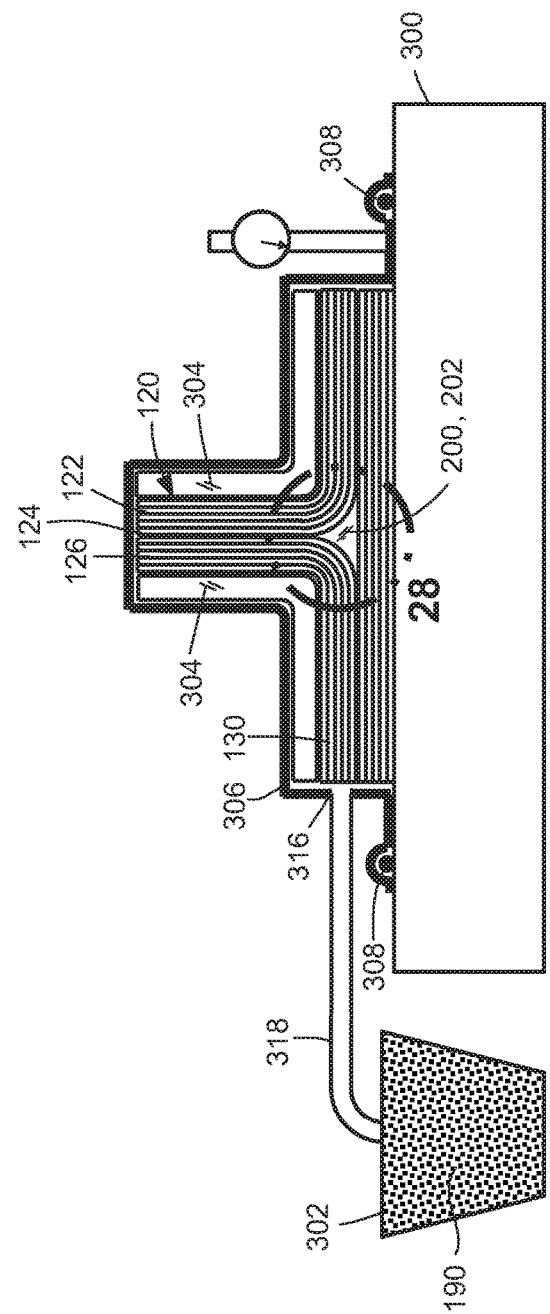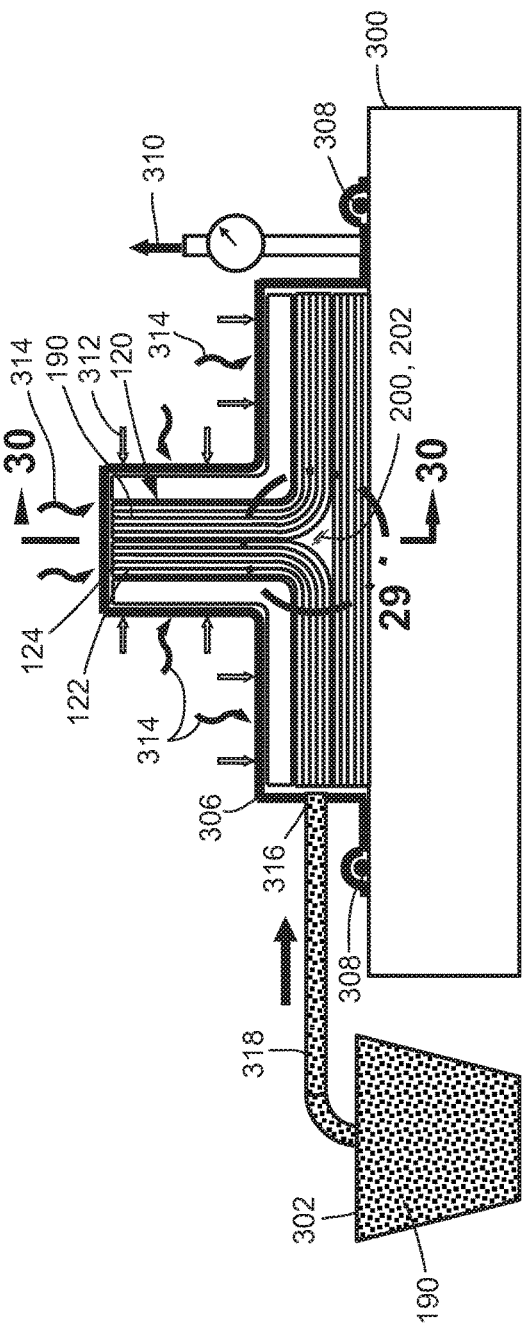

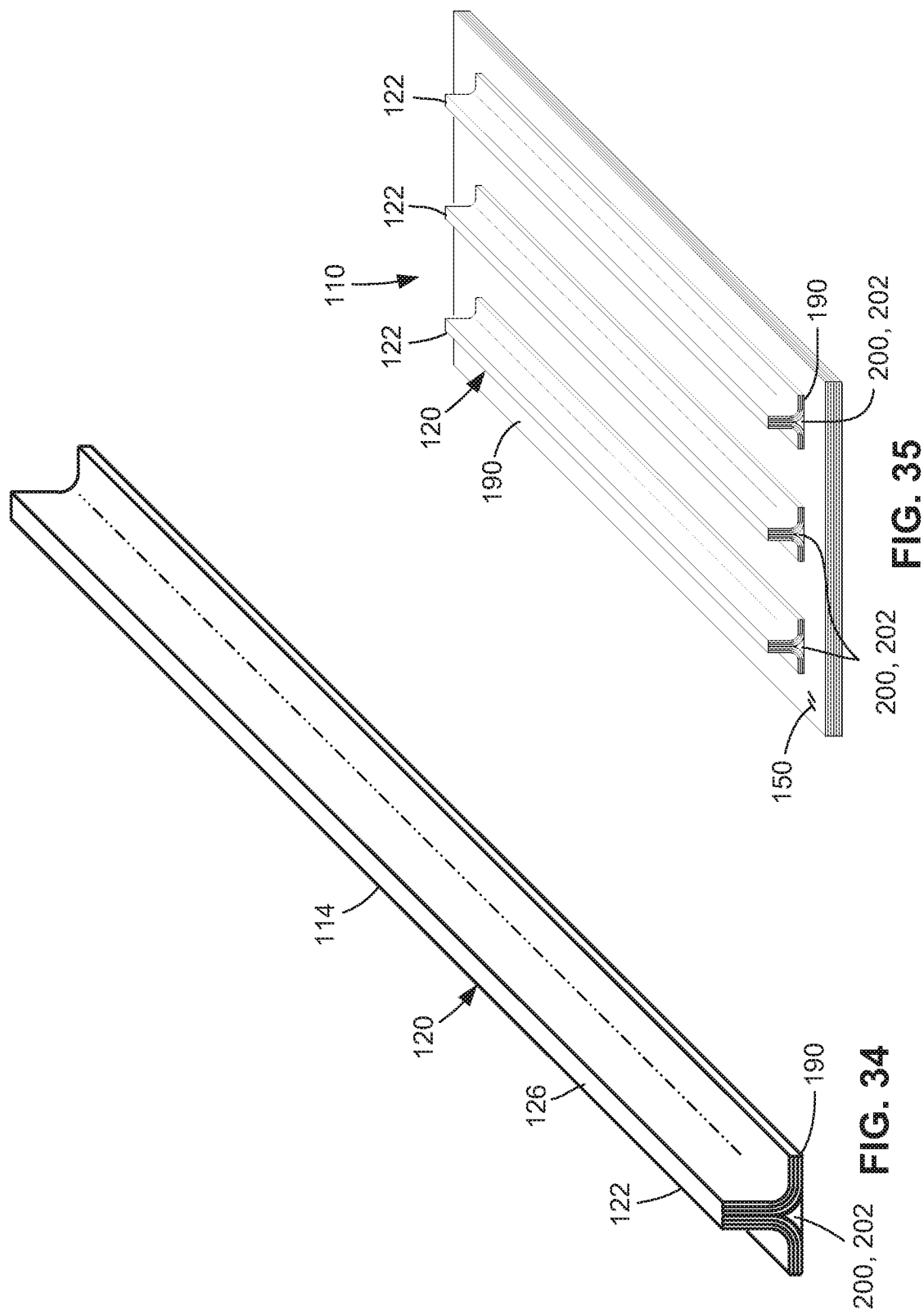

PERMEABLE RADIUS FILLER FOR COMPOSITE STRUCTURE

FIELD

The present disclosure relates generally to composites manufacturing and, more particularly, to a composite structure having a permeable radius filler and a method of manufacturing the composite structure.

BACKGROUND

Composite structures are used in a wide variety of applications due to their high strength-to-weight ratio, corrosion resistance, and other favorable properties. In aircraft construction, composites are used in increasing quantities to form the fuselage, wings, and other components. For example, the wings of an aircraft may include composite skin panels reinforced by composite stringers.

Composite stringers may be provided in a variety of cross-sectional shapes. For example, a composite stringer of a wing panel may have a T-shaped cross-section formed by assembling a pair of composite channels (e.g., L-shaped channels) in back-to-back arrangement. Each composite channel includes a flange portion and a web portion joined at a radiused web-flange transition. The web portions of the composite channels are assembled in back-to-back arrangement to form a composite base member, and which results in a lengthwise notch in the composite base member defined by the web-flange transitions of the back-to-back composite channels. The lengthwise notch may be referred to as a radius cavity of the composite stringer. To improve the strength, stiffness, and durability of a composite structure having composite stringers, it is necessary to fill each radius cavity with a radius filler.

Conventional methods of manufacturing and installing radius fillers present several challenges. For example, one method involves laying up individual strips of prepreg composite material (e.g., unidirectional reinforcing fibers pre-impregnated with resin) into the radius cavity of a composite base member. Each strip of prepreg composite material may be cut to a precise width prior to installation as an individual composite ply into the radius cavity. The ply-by-ply installation of individual strips of prepreg composite material is labor-intensive and time-consuming.

Another method of manufacturing radius fillers involves pre-fabricating each radius filler to match the shape of the radius cavity to be filled. Individual strips of prepreg composite material are laid up in stacked formation to form a radius filler on a layup tool prior to installation of the radius filler in the radius cavity. For a radius filler having unidirectional reinforcing fibers, the axial stiffness of the radius filler and the composite base member may be mismatched. For example, the lengthwise orientation of the unidirectional reinforcing fibers in the radius filler results in a high axial stiffness of the radius filler relative to the axial stiffness of the composite base member. The mismatch in axial stiffness between the radius filler and the composite base member may result in undesirable strength characteristics in the cured composite structure. The effects of relatively high axial stiffness of a radius filler may be pronounced at the terminal ends of a composite stringer where reduced axial stiffness is desired.

One approach for reducing the mismatch in axial stiffness of a radius filler relative to a composite base member is to manufacture the radius filler using a laminating machine configured to laminate prepreg composite plies having non-zero degree fiber orientations (e.g., +/−30 degrees) in addition to laminating composite plies having a zero-degree fiber orientation. The ability to lay up individual composite plies with non-zero fiber orientations provides a means for more closely matching the axial stiffness of the radius filler with the axial stiffness of the composite base member. In addition, the composite plies may be laid up such that the axial stiffness of the radius filler is reduced at the terminal ends of the composite stringer. While the above-described manufacturing method is structurally advantageous, laminating machines represent a significant capital expense for construction, operation, and maintenance.

As can be seen, there exists a need in the art for a system and method of manufacturing a composite structure having a radius filler that avoids the above-noted challenges.

SUMMARY

The above-noted needs associated with radius fillers are specifically addressed and alleviated by the present disclosure which provides a method of manufacturing a cured composite structure the method includes placing a radius filler element into a radius cavity extending along a length of a composite base member. The radius filler element is formed of a permeable material. The method also includes absorbing resin from the composite base member into the permeable material of the radius filler element. The method additionally includes curing or solidifying the resin in the radius filler element and in the composite base member to form a cured composite structure in which the resin bonds the radius filler element to the composite base member.

Also disclosed is a cured composite structure having a composite base member and a radius filler element. The base member has reinforcing fibers embedded in resin and includes a radius cavity extending along a length of the composite base member. The radius filler element extends along a length of the radius cavity. The radius filler element is comprised of a permeable material impregnated with the resin. The resin bonds the radius filler element to the composite base member. In one example, the cured composite structure may be a composite stringer or a composite spar of an aircraft.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft;

FIG. 2 is a top-down view of an example of a cured composite structure configured as wing panel of an aircraft, the wing panel having a composite skin panel and a plurality of composite stringers;

FIG. 3 is a sectional view of the wing panel taken along line 3-3 of FIG. 2 and illustrating a composite stringer coupled to the composite skin panel;

FIG. 4 is a sectional view of the wing panel taken along line 4-4 of FIG. 2 and illustrating a plurality of composite stringers coupled to the composite skin panel;

FIG. 5 is a magnified view of the portion of the wing panel identified by reference numeral 5 in FIG. 4 and illustrating a radius filler element formed of permeable material and filling the radius cavity of each composite stringer;

FIG. 6 is a magnified view of one of the composite stringers showing the radius filler element contained within the radius cavity which is defined by the composite base member and a composite strip;

FIG. 7 is an exploded view of the composite stringer of FIG. 6;

FIG. 9 is an exploded perspective view of an example of a structural assembly having a composite base member having a radius cavity, and further illustrating a radius filler element formed of permeable material for installation in the radius cavity;

FIG. 10 is a perspective view of the structural assembly of FIG. 9 showing the radius filler element installed in the radius cavity of the composite base member and a showing a partially cut away panel strip coupled to the composite base member;

FIG. 11 is a perspective view of an example of an unformed radius filler having three (3) unformed radius filler edges separated by three (2) unformed radius filler side surfaces;

FIG. 12 illustrates the bending of two (2) of the unformed radius filler edges of FIG. 11 toward the remaining unformed radius filler edge to form the unformed radius filler into a cross-sectional shape that is complementary to the cross-sectional shape of the radius cavity;

FIG. 20 is a partially exploded perspective view of an example of a composite base member and a plurality of radius filler segments each formed of permeable material and configured to be inserted into the radius cavity in end-to end arrangement;

FIG. 21 is a perspective view of the structural assembly of FIG. 20 showing the radius filler segments in end-to end arrangement to form a segment series within the radius cavity of the composite base member;

FIG. 24 is a magnified view of the continuous radius filler element in FIG. 22 prior the application of heat to the prepreg composite material of the composite base member and prior to the absorption of resin by the permeable material of the radius filler element;

FIG. 25 is a magnified view of the continuous radius filler element in FIG. 23 after heating the composite base member and showing resin absorbed into the permeable material of the radius filler element;

FIG. 26 is a cross-sectional view of a structural assembly vacuum bagged to a cure tool prior to resin infusion into a composite base member formed of dry fiber material and showing the radius filler element formed of permeable material;

FIG. 27 is a cross-sectional view of the structural assembly of FIG. 26 during the infusion of resin into the composite base member and the absorption of resin from the composite base member into the permeable material of the radius filler element and illustrating the application of heat and pressure for curing the structural assembly;

FIG. 34 is a perspective view of an example of a structural assembly comprising a composite base member containing a radius filler element formed of permeable material;

FIG. 35 is a perspective view of an example of a cured composite structure produced by co-curing or co-bonding a plurality of structural assemblies of FIG. 34 mounted on a composite skin panel;

DETAILED DESCRIPTION

Figure 8:
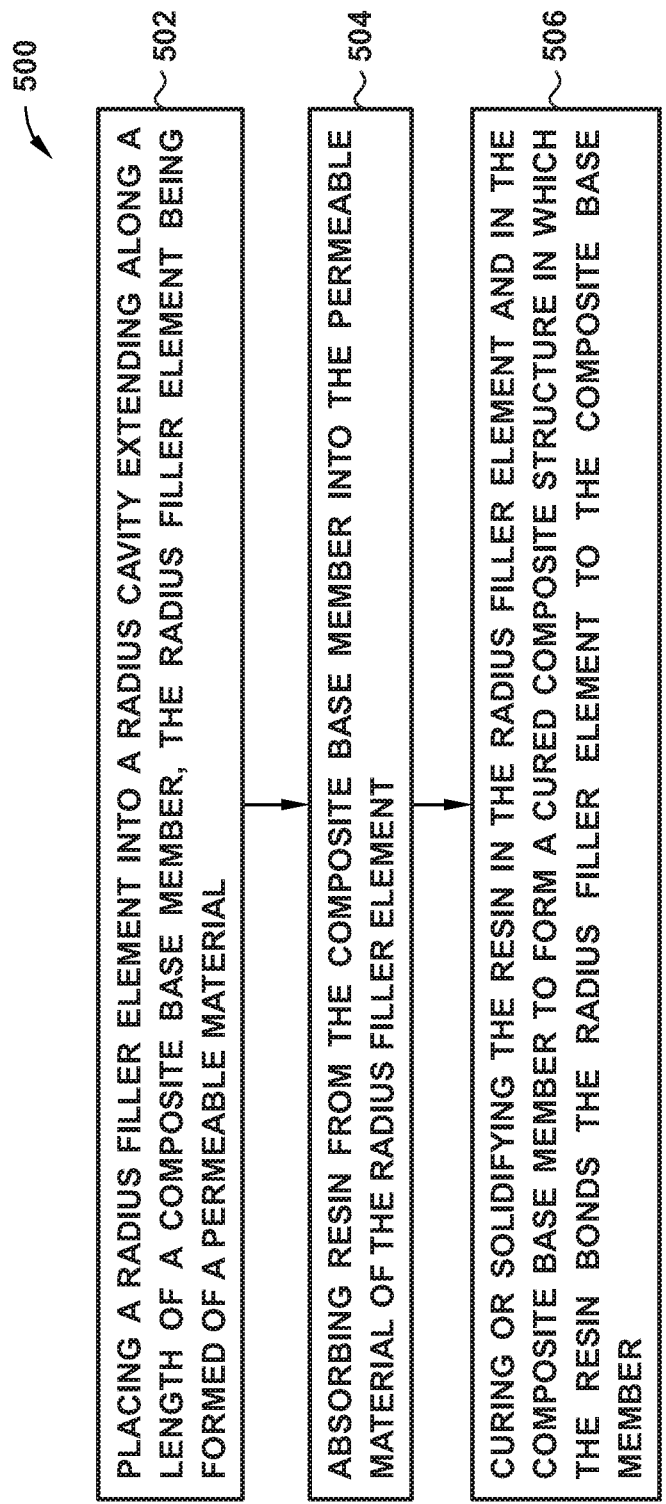
FIG. 8 is a flowchart of operations included in a method of manufacturing a cured composite structure.

Referring now to the drawings which illustrate preferred and various embodiments of the disclosure, shown in FIG. 1 is a perspective view of an aircraft 100 which may include one or more cured composite structures 110 having a radius filler element 200 (FIG. 7) formed of permeable material 202 and manufactured as described below. In the example shown, the aircraft 100 has a fuselage 102, a horizontal tail 104, a vertical tail 106, and a pair of wings 108, any one or more of which may be a cured composite structure 110 manufactured according to one or more aspects of the present disclosure. For example, the aircraft 100 in FIG. 1 may include one or more composite spars 116. FIG. 2 shows a cured composite structure 110 configured as a wing panel 112 having a composite skin panel 150 and a plurality of composite stringers 114 each representing a cured composite structure 110. FIG. 3 is a spanwise sectional view of the wing panel 112 showing a composite stringer 114 coupled to the composite skin panel 150. FIG. 4 is a chordwise sectional view of the wing panel 112 showing the plurality of composite stringers 114 coupled to the composite skin panel 150.

Referring to FIG. 5, shown is a magnified view of a portion of the wing panel 112 of FIG. 2 showing the composite stringers 114 coupled to the composite skin panel 150. The composite skin panel 150 may be comprised of composite plies 124 that may be separately laid up on a wing skin layup tool (not shown). The composite plies 124 of the composite skin panel 150 may be formed of prepreg composite material 125 (FIG. 22) or the composite plies 124 may be formed of dry fiber material 126 (FIG. 26). As described in greater detail below, each one of the composite stringers 114 includes a composite base member 122 and a radius filler element 200 formed of permeable material 202. The composite base member 122 of each composite stringer 114 has a generally V-shaped notch that extends along the length of the composite base member 122. The V-shaped notch may be described as the radius cavity 140 for receiving the radius filler element 200.

Figure 22:
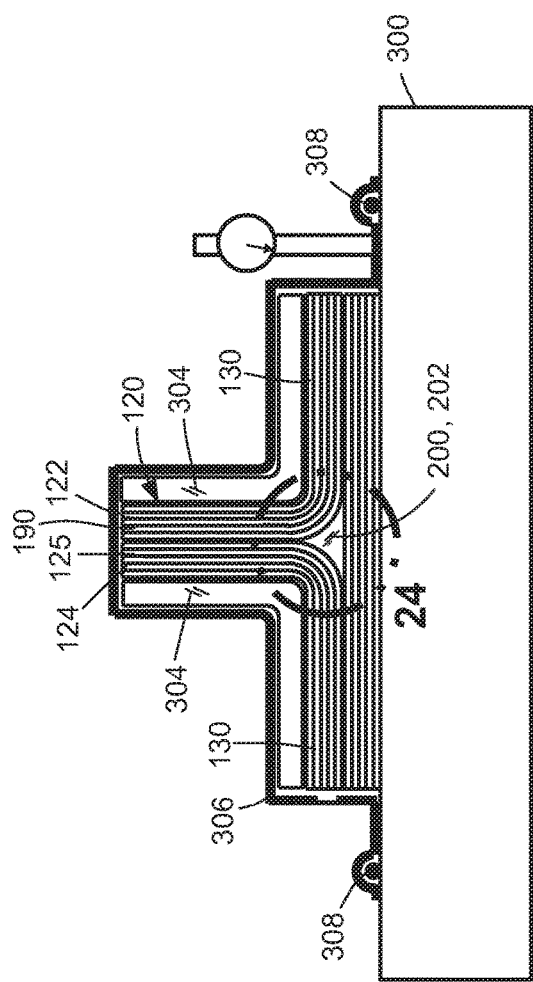
FIG. 22 is a cross-sectional view of a structural assembly vacuum bagged to a cure tool and including a composite base member formed of prepreg composite material and containing the radius filler element formed of permeable material.

In FIG. 5, the composite base member 122 may be comprised of back-to-back composite components 128. In the example shown, each one of the back-to-back composite components 128 is configured as a composite channel 130 having an L-shaped configuration. However, in other examples described below, a composite base member 122 (e.g., FIGS. 36-38) may have composite components 128 having a cross-sectional configuration that is different than the L-shaped configuration shown in FIG. 5. Also in the example of FIG. 5, the composite base member 122 of each composite stringer 114 may include a composite strip 152 coupled to the composite components 128 to encapsulate the radius filler element 200 within the radius cavity 140. The composite base member 122 is comprised of composite plies 124 which may be provided as dry fiber material 126 (FIG. 26) or as prepreg composite material 125 (FIG. 22). The composite plies 124 include reinforcing fibers which may be arranged as unidirectional fibers, as woven cloth, or in other fiber arrangements. For a composite base member 122 having composite plies 124 formed of dry fiber material 126, resin 190 (FIG. 26) such as thermosetting resin or thermoplastic resin is infused into the dry fiber material 126 of the composite base member 122 and a portion of the resin 190 is absorbed by the permeable material 202 of the radius filler element 200, after which the resin 190 is cured (e.g., for thermosetting resin) or solidified (e.g., for thermoplastic resin) to result in a cured composite stringer 114. For a composite base member 122 having composite plies 124 formed of prepreg composite material 125 (i.e., reinforcing fibers pre-impregnated with resin 190—FIG. 22), heat 314 (FIG. 23) is applied to reduce the viscosity of the resin 190 in the prepreg composite material 125 and a portion of the resin 190 is absorbed into the permeable material 202 of the radius filler element 200 (FIG. 25), after which the resin 190 is cured to result in a cured composite structure 110.

The cured composite structure 110 of FIG. 5 may be produced by curing a plurality of structural assemblies 120 mounted to a composite skin panel 150 also laid up with composite plies 124. Alternatively, the cured composite structure 110 FIG. 5 may be produced by curing the composite skin panel 150 as a separate operation from the curing of the composite stringers 114, after which the cured composite stringers 114 may be subsequently bonded to the composite skin panel 150. In the present disclosure, the term "composite structure" encompasses cured composite structures 110 containing cured thermosetting resin, and also encompasses cured composite structures 110 containing solidified thermoplastic resin. As indicated above, a cured composite structure 110 includes reinforcing fibers embedded in resin 190 and having at least one radius filler element 200 formed of permeable material 202 containing resin 190 which absorbed from the composite base member 122 during the curing or solidification process.

Referring to FIG. 6, shown is a magnified view of an example of a cured composite stringer 114. FIG. 7 is an exploded view of the composite stringer 114 of FIG. 6 showing the radius cavity 140 containing the radius filler element 200. The composite base member 122 is comprised of two composite components 128 configured as composite channels 130 arranged in back-to-back relation to each other. The composite channels 130 each have an L-shaped cross-section which, when assembled, define a T-shaped cross-section of composite stringer 114. However, as mentioned above, a cured composite structure 110 may be formed by assembling composite channels 130 having any one a variety of different cross-sectional shapes such as a J-shaped cross-section (FIG. 36), an I-shaped cross-section (FIG. 37), a hat-shaped cross-section (FIG. 38), or any one of a variety of other configurations.

Each composite component 128 in FIGS. 6-7 has a web portion 132 and at least one flange portion 136 interconnected by a radiused web-flange transition 138. When composite channels 130 are assembled in back-to-back relationship, the web-flange transitions 138 of the back-to-back composite channels 130 define the radius cavity 140. As mentioned above, the radius filler element 200 improves the strength characteristics of the cured composite structure 110. For example, the radius filler element 200 improves the magnitude of the pulloff load 400 that may be applied to a composite stringer 114 coupled to a composite skin panel 150. The radius cavity 140 has opposing radius cavity surfaces 142. The radius filler element 200 has radius filler side surfaces 204 which include opposing concave surfaces 206 that are interconnected by a flat surface 208. The concave surfaces 206 of the radius filler element 200 are respectively configured complementary to the radius cavity surfaces 142. The radius cavity surfaces 142 and the radius filler side surfaces 204 define the side surface interfaces 210 between the radius filler element 200 and the composite base member 122.

As mentioned above, the radius filler element 200 is formed of permeable material 202 which may be homogenous throughout the radius filler element 200. In some examples, in addition to permeable material 202, the radius filler element 200 may include randomly oriented chopped fibers or other filler material or constituents which may be distributed throughout the radius filler element 200 for improving the mechanical properties of the cured composite structure 110. In some examples, the radius filler element 200 may be devoid of unidirectional reinforcing fibers extending along a lengthwise direction of the radius filler element 200. The absence of unidirectional reinforcing fibers in the radius filler element 200 may advantageously reduce the load-carrying capability of the radius filler element 200 including the load-carrying capability along the lengthwise direction. In this regard, the permeable material 202 of the radius filler element 200 may be described as being non-structural in the sense that the radius filler element 200 may have a relatively low or negligible contribution to the axial strength, axial stiffness, and/or bending stiffness of the cured composite structure 110.

As described in greater detail below, during the process of curing the structural assembly 120 (e.g., the composite base member 122 and the radius filler element 200), the permeable material 202 of the radius filler element 200 absorbs resin 190 from the base member. As mentioned above, the composite base member 122 may be comprised of prepreg composite material 125 (FIG. 22), or the composite base member 122 may be comprised of dry fiber material 126 (FIG. 26) that is infused with resin 190 during a resin infusion process such as the below-described resin transfer molding process (FIGS. 26-29). The resin 190 from the composite base member 122 soaks into the permeable material 202 of the radius filler element 200 and which, when cured, results in the resin 190 bonding the radius filler element 200 to the composite base member 122. When viewed in cross-section (e.g., FIGS. 25 and 29), the resin 190 bonding the radius filler element 200 to the cured composite structure 110 structurally integrates the radius filler element 200 with the composite base member 122. The bondline between the radius filler element 200 and the composite base member 122 may be described as blended and indistinct. The blended nature of the bondline between the radius filler element 200 and the composite base member 122 significantly reduces or eliminates the propensity for cracks to develop in the bondline, which significantly improves the strength and durability characteristics of the cured composite structure 110.

As mentioned above, the composite base member 122 may be comprised of composite plies 124 formed of prepreg composite material 125 or dry fiber material 126. Regardless of whether the resin 190 is preimpregnated in the composite plies 124 (e.g., prepreg composite material 125—FIGS. 22-23) or the resin 190 is infused into dry fiber material 126 (FIGS. 26-27), the resin 190 may be a thermoplastic resin or a thermosetting resin. Thermoplastic resin may comprise any one of a variety of materials including, but not limited to, acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material, acrylics, fluorocarbons, polyamides, polyolefins, polyesters, polycarbonates, polyurethanes, polyetherimides, polyethersulfone, polysulfone, and polyphenylsulfone. Thermosetting resin may comprise any one of a variety of materials including, but not limited to, polyurethanes, phenolics, polyimides, sulphonated polymer, a conductive polymer, benzoxazines, bismaleimides, cyanate esters, polyesters, epoxies, and silsesquioxanes. The reinforcing fibers of the composite base member 122 may be formed of polymeric material (e.g., plastic), glass, ceramic material, carbon (e.g., graphite), metallic material, or any combination thereof. A cured composite structure 110 may include composite plies 124 having any one of a variety of fiber/resin material combinations including, but not limited to, fiberglass/epoxy, carbon/epoxy, carbon/bismaleimide, and fiberglass/phenolic.

The permeable material 202 of the radius filler element 200 may be woven material or non-woven material formed of non-unidirectional fibers and capable of absorbing resin 190 and being non-chemically-reactive with the resin 190. The permeable material 202 of the radius filler element 200 is non-layered and may be described as a homogenous material as distinguished from conventional radius fillers that are formed of one or more layers or plies of prepreg composite material. The permeable material 202 may be a natural material, a synthetic material, or any combination thereof. A natural material of the radius filler element 200 may be an animal-based material including leather, silk, and/or wool. Alternatively or additionally, a natural material of the radius filler element 200 may be a plant-based material including cotton, linen, jute, and/or hemp. In a specific example, the radius filler may be formed of a plant-based material such as flox which may be described as ground up denim material.

The permeable material 202 of the radius filler element 200 may alternatively or additionally be made up of a synthetic material or man-made material. Examples of synthetic material of the radius filler element 200 include woven, felted, or knitted synthetic fibers, including Nylon™, Dacron™, and/or Rayon™. Alternatively or additionally, synthetic material of the radius filler element 200 may include open-cell rubber or open-cell foam including polyurethane foam, Neoprene™, and/or Lycra™. The natural material or synthetic material of the radius filler element 200 may include fibers having any one of a variety of configurations. For example, the fibers may be short and/or curly. The fibers of the permeable material 202 may be interconnected such as woven, knitted, or felted fibers. Felt may be described as intertwined natural or synthetic fibers that are matted, condensed, and/or pressed together.

Figure 13:
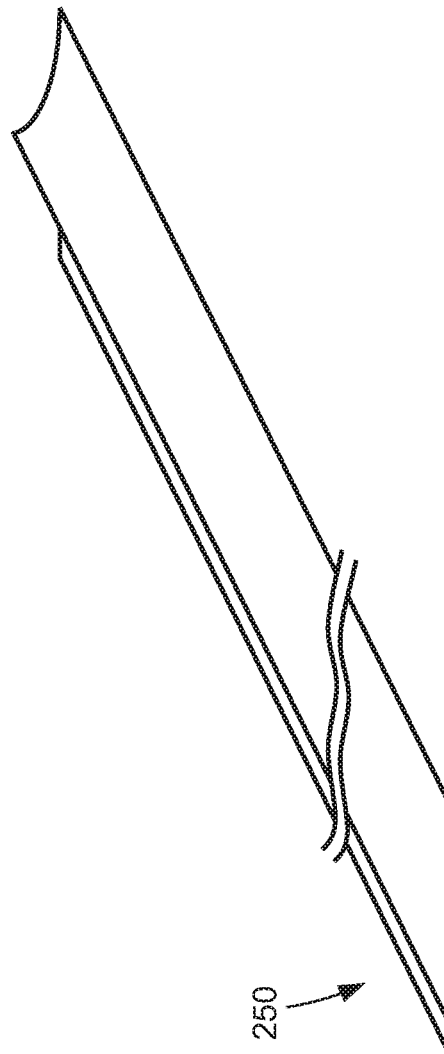
FIG. 13 is a perspective view of an example of an unformed radius filler half having a triangularly-shaped cross section having a filler half base surface having opposing filler half base edges and having opposing filler half side surfaces intersecting at a filler half apex.
Figure 14:
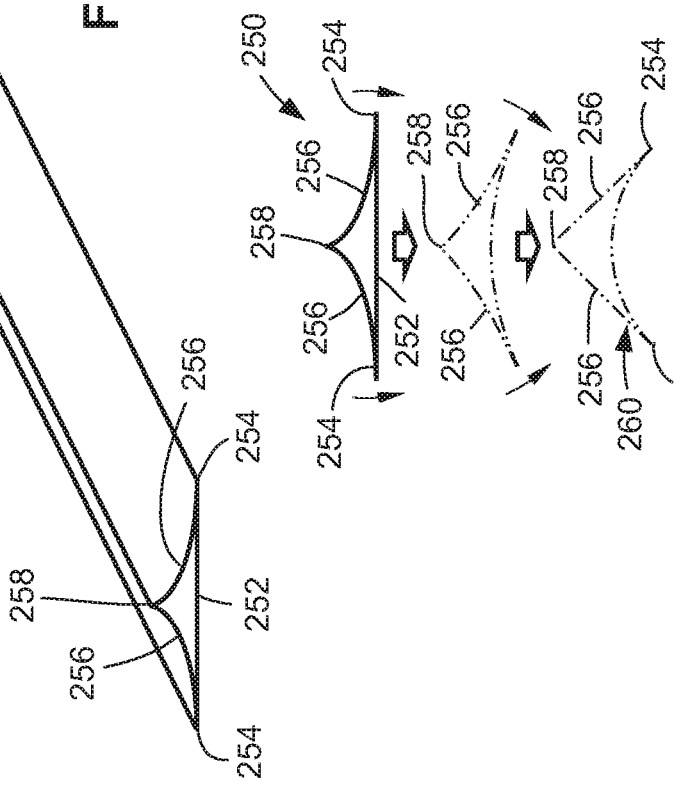
FIG. 14 illustrates the bending of the opposing filler half base edges of the radius filler half toward the filler half apex until the filler half side surfaces form an approximate right angle and the filler half base surface assumes a concave shape.
Figure 15:
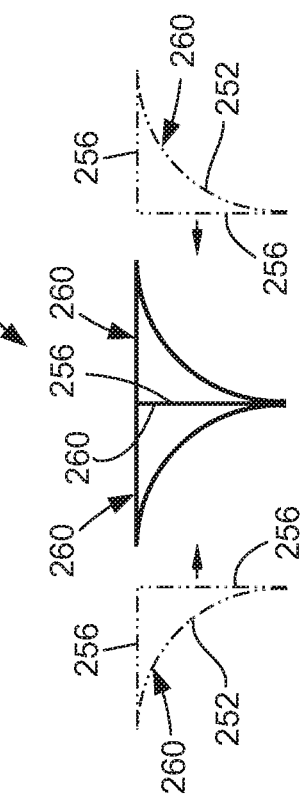
FIG. 15 shows the assembly of a pair of the formed radius filler halves in back-to-back relation with each other to define a radius filler element having a cross-sectional shape that is complementary to the cross-sectional shape of the radius cavity.

In a specific example of natural material, the radius filler element 200 may be formed of natural leather and/or synthetic leather. For example, a radius filler element 200 may be formed of a solid leather fillet having a low-profile triangularly-shaped cross-section and which is commercially available from Freeman Manufacturing & Supply Company of Avon, Ohio. As shown in FIGS. 13-15 and described in greater detail below, such leather fillets (e.g., unformed radius filler halves 250—FIG. 13) may be physically manipulated into a desired cross-sectional shape (e.g., a formed radius filler half 260—FIG. 14) and assembled in back-to-back relation with one another (e.g., FIG. 15) to form a radius filler element 200 having a cross-sectional shape that is complementary to the cross-sectional shape of the radius cavity 140. As an alternative to physically manipulating and assembling such leather fillets, a single leather fillet (not shown) may be provided as a unitary structure having a cross-sectional shape (e.g., via machining or extrusion) that matches the cross-sectional shape of the radius cavity 140. In still further examples not shown, a single leather fillet may be physically manipulated (e.g., bent) into a cross-sectional shape that is complementary to the cross-sector shape of the radius cavity 140. Advantageously, a radius filler element 200 formed of leather may have a reduced overall weight relative to a conventional radius filler (not shown) formed of prepreg composite plies (e.g., carbon-epoxy composite plies). For example, leather containing cured resin 190 may have a density of approximately 80 pounds per cubic foot (lbs/ft$^3$) versus cured carbon-epoxy laminate which has a density of approximately 95 lbs/ft$^3$.

The permeable material 202 of the radius filler element 200 (containing cured resin 190) has a Young's modulus that is less than the Young's modulus of the composite base member 122 (when cured) along the axial or lengthwise direction of the radius filler element 200. The relatively low Young's modulus of the radius filler element 200 advantageously allows the cured composite structure 110 to strain significantly without the radius filler element 200 carrying some of the load. As an alternative to or in addition to a relatively low Young's modulus, the permeable material 202 of the radius filler element 200 (containing cured resin 190) has a percent elongation at failure (e.g., along the axial or lengthwise direction) that is higher than the percent elongation at failure of the composite base member 122 (when cured). Percent elongation at failure may be defined as the percentage increase in length (e.g., from its original length) of a component (not shown) at the breaking point, and is a measure of the ability of the component to stretch prior to breaking.

In the present disclosure, a high percent elongation at failure of the radius filler element 200 relative to that of the composite base member 122 represents a reduced axial stiffness of the radius filler element 200 relative to the axial stiffness of the composite base member 122. In the context of composite stringers 114 coupled to a composite skin panel 150 as shown in FIG. 5, a relatively high percent elongation at failure of the radius filler element 200 means that the composite stringers 114 may axially strain a significant amount without the risk of failure (e.g., cracking) of the radius filler elements 200. In addition, the presently-disclosed radius filler element 200 allows for reduced axial stiffness at the terminal ends of the composite stringers 114 which reduces or prevents the occurrence of stress concentrations in the composite skin panel 150 at the location of the terminal ends of the composite stringers 114. Furthermore, a cured composite structure 110 (e.g., a composite stringer 114) having a radius filler element 200 formed of permeable material 202 may be lighter in weight than a comparable composite structure having a conventional radius filler formed of laminated carbon-epoxy composite plies 124 (not shown).

As indicated above, a radius filler element 200 comprised of permeable material 202 containing cured resin 190 may be softer and/or more ductile than the composite base member 122 (when cured), and which may result in the radius filler element 200 being less prone to cracking. Although the radius filler element 200 may be devoid of unidirectional reinforcing fibers as mentioned above, in some examples, a radius filler element 200 may include unidirectional reinforcing fibers if such reinforcing fibers have a Young's modulus that is relatively closely matched (e.g., within 10%) of the Young's modulus of the composite base member 122 of the cured composite structure 110. In one example, a radius filler element 200 having unidirectional glass fibers (e.g., fiberglass) may have a lower Young's modulus than a composite base member 122 having carbon fibers impregnated in resin 190.

By forming the radius filler element 200 from permeable material 202 configured to absorb resin 190, the cured composite structure 110 made deform significantly in the direction of a load (e.g., along a lengthwise direction) without failure of the radius filler element 200. Such failure may otherwise be manifested as microcracking of the radius filler element 200 which may compromise the structural integrity of the cured composite structure 110 when loaded. For example, microcracking in the radius filler element 200 may propagate to the side surface interfaces 210 (e.g., FIG. 7) between the radius filler element 200 and the composite base member 122. Loads on the cured composite structure 110 may include loads during manufacturing and loads when the cured composite structure 110 is placed in service.

Manufacturing loads may include loads on the cured composite structure 110 due to differential shrinkage of the radius filler element 200 relative to the composite base member 122 during curing (e.g., chemical shrinkage) and/or during cool-down (e.g., thermal shrinkage) as the cured composite structure 110 cools from an elevated cure temperature or glass transition temperature down to room temperature. In-service loads on the cured composite structure 110 may include mechanical loads such as flight loads imposed on a composite wing panel 112 of an aircraft 100. In-service loads may also include loads due to differential thermal expansion or contraction of the radius filler element 200 relative to the composite base member 122. In the example of an aircraft 100, thermal expansion or contraction may occur as a result of changes in ambient air temperature as may occur when an aircraft 100 on the ground (e.g., ambient air temperature of up to 100° F.) climbs to a cruising altitude with relatively low ambient air temperatures (e.g., down to −70° F.).

Advantageously, forming the radius filler element 200 from permeable material 202 allows the cured composite structure 110 to strain significantly without the radius filler element 200 carrying some of the load. As mentioned above, the presently-disclosed radius filler element 200 has a reduced risk of cracking which may otherwise propagate to the side surface interfaces 210. Cracking at the side surface interfaces 210 may compromise the load-carrying capability of the composite structure, such as the ability of the composite structure to withstand a pulloff load 400 (FIG. 5) exerted by the composite stringers 114 on a composite panel. As shown in FIG. 5, pulloff loads 400 may be oriented perpendicular to the plane of the composite skin panel 150 and may urge the composite stringers 114 away from the composite skin panel 150 with a tendency to separate or de-bond the composite stringers 114 from the composite skin panel 150.

Referring to FIG. 8, shown is a flowchart of operations included in a method 500 of manufacturing a cured composite structure 110. Referring additionally to FIGS. 9-10, step 502 of the method 500 includes placing a radius filler element 200 into a radius cavity 140 extending along a length of a composite base member 122 to form an uncured structural assembly 120. FIG. 10 is an assembled view of the structural assembly 120 of FIG. 9 showing the radius filler element 200 installed within the radius cavity 140. In the example shown, the radius filler element 200 extends continuously along the length of the composite base member 122. As mentioned above, the composite base member 122 may be formed of prepreg composite material and 25 (FIG. 22) or dry fiber material 126 (FIG. 26). In the example shown, the composite base member 122 may comprise two composite components 128 such as two composite channels 130 each having an L-shaped configuration and arranged in back-to-back relation to each other to form the radius cavity 140. The composite base member 122 may optionally include a composite skin panel 150 (FIG. 35) or a composite strip 152 (FIGS. 9-10) that may be assembled to capture the radius filler element 200 within the radius cavity 140.

Referring still to FIGS. 9-10, as described above, the radius filler element 200 is formed of a permeable material 202 which may be a natural material, a synthetic material, or a combination thereof, and which is capable of absorbing resin 190. As mentioned above, the permeable material 202 of the radius filler element 200 of the cured composite structure 110 has a Young's modulus that is less than the Young's modulus of the composite base member 122 of the cured composite structure 110. Alternatively or additionally, the permeable material 202 of the radius filler element 200 of the cured composite structure 110 has a percent elongation at failure that is greater than the percent elongation at failure of the composite base member 122 of the cured composite structure 110. The method may optionally include manufacturing the radius filler element 200 prior to installation in the radius cavity 140. For example, the radius filler may be formed by casting, pressing, die extrusion, machining, three-dimensional printing, assembling and/or any one of a variety of other manufacturing techniques. The selection of the means for manufacturing the radius filler element 200 may be dependent upon the composition of the permeable material 202. For example, a radius filler element 200 comprised of certain synthetic materials such as open cell foam may be manufactured by machining or three-dimensional printing.

Referring to FIGS. 11-15, shown are examples of the manufacturing of a radius filler element 200 prior to installation in the radius cavity 140. FIGS. 11-12 illustrates an example of manufacturing a radius filler element 200 by providing an unformed radius filler 230 formed of permeable material and which may have a cross-sectional shape that is different than the cross-sectional shape of the radius cavity 140 (FIG. 9). The method may include forming the unformed radius filler 230 into a cross-sectional shape that approximately matches the cross-sectional shape of the radius cavity 140 to define the radius filler element 200. For example, an unformed radius filler 230 may be formed into the cross-sectional shape of the radius cavity by bending and/or pulling on any one or more portions of the unformed radius filler 230. In the example of FIG. 11, the unformed radius filler 230 has a generally triangular cross-sectional shape having three (3) unformed radius filler edges 232 and three (3) unformed radius filler side surfaces 234 each having a concave shape. As shown in FIG. 12, the method may include bending two (2) of the unformed radius filler edges 232 toward the remaining one of the unformed radius filler edges 232 until the unformed radius filler side surface 234 extending between the two (2) unformed radius filler edges 232 assumes a generally flat shape and the remaining two (2) radius filler side surfaces assume a concave shape that is complementary or substantially matches the radiuses defining the opposing sides of the radius cavity 140. However, the unformed radius filler 230 may initially have any one of a variety of different cross-sectional shapes, and is not limited to the generally triangular cross-sectional shape shown in FIG. 11. In addition, the unformed radius filler 230 may be comprised of any one of a variety of permeable materials such as any of the above-described natural materials and/or synthetic materials.

Referring to FIGS. 13-15, shown is an example of the manufacturing of a radius filler element 200 using commercially available off-the-shelf items in the form of leather strips available from Freeman Manufacturing & Supply Company of Avon, Ohio, for producing a radius filler element 200. In the example shown, the step of providing an unformed radius filler may include providing a pair of unformed radius filler halves 250 each having a triangularly-shaped cross section. Referring to FIG. 13, in their original undeformed state, the triangularly-shaped cross-section of each unformed radius filler half 250 may be symmetrical and has a planar filler half base surface 252 and concavely-shaped filler half side surfaces 256. The filler half base surface 252 has opposing filler half base edges 254. In the example shown, the filler half base surface 252 is at least twice the length of the height of the triangularly-shaped cross-section. The height is measured perpendicularly from the filler half base surface 252 to a filler half apex 258. However, the unformed radius filler half 250 may be provided in alternative sizes and configurations, and is not limited to the example shown.

As shown in FIG. 14, the method may include forming each unformed radius filler half 250 into a formed radius filler half 260 by bending the opposing filler half base edges 254 away from the filler half apex 258 until the filler half side surfaces 256 generally flatten. The filler half base edges 254 may be bent away from the filler half apex 258 until the filler half side surfaces 256 form an approximate right angle locally at the intersection of the filler half side surfaces 256. When the filler half side surfaces 256 form a right angle relative to each other, the filler half side surfaces 256 may each flatten and the filler half base surface 252 may assume a concave shape that approximates the curvature of the radius cavity surface 142 (FIG. 7) defining the radius cavity 140 (FIG. 7).

As shown in FIG. 15, the method may include assembling a pair of the formed radius filler halves 260 in back-to-back abutting relation to each other to define the radius filler element 200. In some examples, the method may involve the use of adhesive to bond together the back-to-back filler half side surfaces 256 of the formed radius filler halves 260 either prior to insertion into the radius cavity 140, or after insertion into the radius cavity 140. In other examples, a pair of formed radius filler halves 260 may be inserted into a radius cavity 140 without bonding together the filler half side surfaces 256. As described below, during the absorption of resin 190 (FIG. 25) into the permeable material 202 of the formed radius filler halves 260, resin 190 may also be drawn (e.g., via capillary action) between the back-to-back formed radius filler halves 260. Upon curing of the resin 190, the resin 190 in each radius filler half may intermingle and bond the radius filler halves together. Although the example of forming a radius filler element 200 is described in the context of commercially available leather strips, any one of a variety of permeable materials 202 having any one of a variety of cross-sectional shapes may be used for manufacturing a radius filler element 200.

Figure 18:
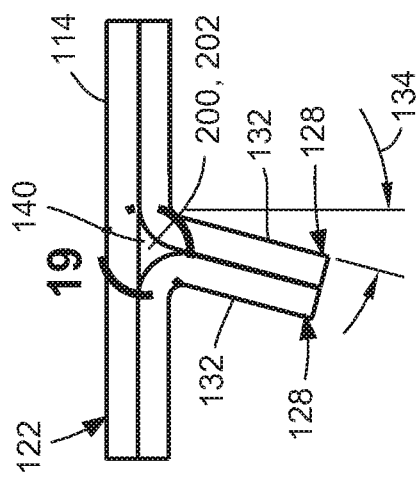
FIG. 18 is a cross-sectional view of an example of a composite stringer taken along line 18-18 of FIG. 3 and illustrating the web portions oriented at a web angle that is non-perpendicular to the flange portions.
Figure 19:
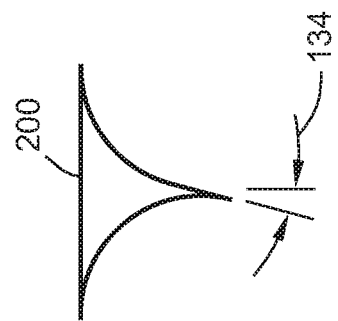
FIG. 19 is a magnified view of the radius filler element of FIG. 18.
Figure 16:
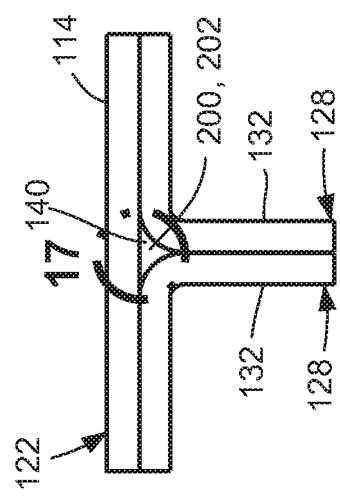
FIG. 16 is a cross-sectional view of an example of a composite stringer taken along line 16-16 of FIG. 3 and illustrating back-to-back composite channels each having a web portion oriented perpendicular to a flange portion.
Figure 17:
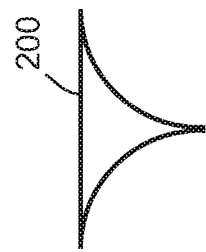
FIG. 17 is a magnified view of the radius filler element of FIG. 16.

Referring to FIGS. 16-19, shown is an example of a composite base member 122 and radius filler element 200 in which the cross-sectional shape is different at different locations along the lengthwise direction. FIG. 16 shows a cross-sectional view of a composite stringer 114 having back-to-back composite components 128 each including a web portion 132 oriented perpendicular to the flange portion 136. FIG. 17 is a magnified view of the radius filler element 200 of FIG. 16. FIG. 18 is a cross-sectional view of the same composite stringer 114 at a different lengthwise location and illustrating the web portions 132 of the composite base member 122 oriented at a local web angle 134 that is non-perpendicular to the flange portions 136. FIG. 19 is a magnified view of the radius filler element 200 of FIG. 18 showing the cross-sectional shape of the radius filler element 200, which is different than the cross-sectional shape of the radius filler element 200 shown in FIG. 17. The method 500 may include manufacturing the radius filler element 200 with a cross-sectional shape that is complementary to the cross-sectional shape of the radius cavity 140. For example, the radius filler element 200 may be manufactured to match the changing web angle of the web portion 132 of the composite base member 122. However, in examples where the variation in cross-sectional shape or change in local web angle 134 is relatively small, a radius filler element 200 having a constant cross-sectional shape may be used.

Referring to FIGS. 20-21, in some examples, step 502 of placing the radius filler element 200 into the radius cavity 140 may comprise inserting a plurality of radius filler segments 220 into the radius cavity 140 in a manner such that the opposing segment ends 222 of the radius filler segments 220 are in end-to-end arrangement within the radius cavity 140. FIG. 20 shows an example of a composite base member 122 and a plurality of radius filler segments 220 each formed of a permeable material 202. FIG. 21 is an assembled view of the structural assembly 120 of FIG. 20 showing the radius filler segments 220 in end-to-end arrangement to form a segment series 226 within the radius cavity 140 of the composite base member 122. Although FIGS. 20-21 show three (3) radius filler segments 220, any number of radius filler segments 220 may be installed in end-to-end relation within the radius cavity 140. In one example, the radius filler segments 220 may each be provided in a length of approximately 3-15 feet. However, one or more of the radius filler segments 220 may be shorter than 3 feet or longer than 15 feet. Advantageously, forming the radius filler element 200 as a plurality of end-to-end radius filler segments 220 provides advantages with regard to manufacturing, handling, and/or installation. For example, forming the radius filler segments 220 in a certain length may allow for manual handling and manual installation of individual radius filler segments 220 into the radius cavity 140, and may avoid the need for specialized equipment for picking up and placing a relatively long radius filler element 200 into a radius cavity 140.

Radius filler elements 200 or radius filler segments 220 formed of permeable material 202 provide several advantages relative to conventional radius fillers. For example, the presently-disclosed radius filler formed of permeable material 202 may be described as being inert in the sense that the permeable material 202 may be devoid of resin 190 during installation into the radius cavity 140. In this regard, the permeable material 202 of the radius filler element 200 may be insensitive to out-time and temperature, unlike prepreg thermosetting materials (e.g., prepreg composite plies 124) used in manufacturing conventional radius fillers and which require storage at cold temperatures to prevent premature curing of the prepreg material prior to layup and final cure of such conventional radius filler. In view of the insensitivity and/or inertness of the permeable material 202, the radius filler element 200 or radius filler segments 220 may be manufactured off-site and in advance of the need for insertion into the radius cavity 140 of a composite base member 122 at a production facility. As known in the art, the out-time of thermosetting composite prepreg may be described as the amount of time that a composite prepreg material may be taken out of cold storage and exposed to ambient temperature and which typically reduces the shelf life of a composite prepreg. As mentioned above, the radius filler element 200 may be formed as a plurality of relatively short radius filler segments 220 which are conducive to off-site manufacturing and shipping to the production facility, thereby saving valuable floor space and eliminating equipment costs associated with equipment for on-site manufacturing of radius filler elements 200 or radius filler segments 220.

As shown in FIGS. 20-21, the radius filler segments 220 may be inserted into the radius cavity 140 such that the end surfaces 224 are in close proximity to each other such as in abutting contact or with relatively small gaps (e.g., less than 0.010 inch) at the end-to-end interface 228 between the segment ends 222. As mentioned above, when resin 190 (FIG. 25) is absorbed into the permeable material 202 of the radius filler segments 220, resin 190 may also be drawn (e.g., via capillary action) between the segment ends 222. When the resin 190 cures (e.g., for thermosetting resin) or solidifies (e.g., for thermoplastic resin), the segment ends 222 may be bonded together such that the radius filler segments 220 define a continuous radius filler element 200. Although not shown, the segment ends 222 of the radius filler segments 220 may optionally include interlocking features (e.g., a tab and socket arrangement) for interconnecting the segment ends 222 of the radius filler segments 220. The interlocking features of the segment ends 222 may ensure that the end surfaces 224 of adjacent radius filler segments 220 contact each other which may improve the bond provided by the resin 190 between the radius filler segments 220. The interlocking features may also prevent lengthwise shifting of the positions of the radius filler segments 220 relative to each other within the radius cavity 140 during curing or solidification of the resin 190.

Referring to FIGS. 22-25, shown in FIG. 22 is a cross-sectional view of a structural assembly 120 mounted on a cure tool 300 and including a composite base member 122 formed of prepreg composite material 125 and containing the radius filler element 200 formed of permeable material 202. As mentioned above, the prepreg composite material 125 may be comprised of a plurality of composite plies 124 each containing reinforcing fibers embedded in resin 190. The resin 190 may be a thermosetting resin or a thermoplastic resin. The reinforcing fibers of each composite ply 124 may be provided in any one of a variety of arrangements including woven, non-woven, braided, and/or as unidirectional reinforcing fibers.

The structural assembly 120 is shown vacuum bagged to the cure tool 300 in preparation for the application of heat 314 (FIG. 23) and compaction pressure 312 (FIG. 23) for reducing the viscosity of the resin 190 in the prepreg composite material 125. The arrangement may include one or more caul plates 304 positioned on the composite base member 122 for applying uniform compaction pressure 312 (e.g., FIG. 23) on the composite base member 122. The vacuum bag 306 and one or more processing layers (e.g., a breather layer, a release layer—not shown) may be placed over the caul plates 304 and structural assembly 120 to facilitate outgassing and curing (e.g., for thermosetting resin) or solidification (e.g., for thermoplastic resin) of the composite base member 122. The perimeter of the vacuum bag 306 may be sealed to the cure tool 300 using an edge seal 308 such as tape sealant or tacky tape. Vacuum fittings (not shown) may be coupled to the vacuum bag 306 and may be fluidly connected to a vacuum source 310 such as a vacuum pump (not shown). Although not shown, the arrangement may be positioned in an autoclave for resin infusion and curing or solidification of the structural assembly 120. In other examples, the structural assembly 120 may be infused and cured or solidified in an out-of-autoclave process.

FIG. 24 is a magnified view of the radius filler element 200 encapsulated by the surrounding structure of the composite base member 122 prior the application of heat 314 (FIG. 22) to the prepreg composite material 125 of the composite base member 122 and prior to the absorption of resin 190 by the radius filler element 200. The radius filler element 200 is captured between the composite plies 124 of prepreg composite material 125 of the composite channels 130 and composite strip 152. The concave surface 206 on each side of the radius filler element 200 is shaped complementary to the radius cavity surface 142 of the web-flange transition 138. The radius filler element 200 may have a cross-sectional size and shape such that the concave surfaces 206 are in intimate contacting relation respectively with the radius cavity surfaces 142 of the web-flange transitions 138 of the composite channels 130. However, prior to absorption of resin 190 into the permeable material 202, a relatively small gap (e.g., less than 0.010 inch) may exist between one or both of the concave surfaces 206 of the radius filler element 200 and a corresponding one of the radius cavity surfaces 142 of the composite base member 122. The flat surface 208 of the radius filler element 200 may also be in intimate contacting relation with the panel surface 154 of the composite strip 152 or composite panel (not shown). However, prior to resin 190 infusion, a small gap (e.g., less than 0.010 inch) may exist between the flat surface 208 of the radius filler element 200 and the panel surface 154 of the composite strip 152 or composite skin panel (not shown).

Figure 23:
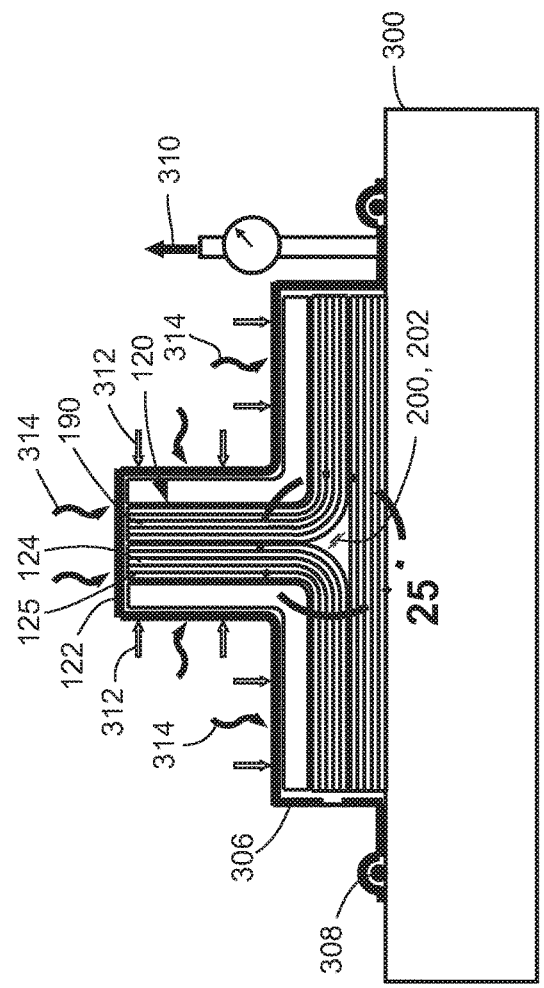
FIG. 23 is a cross-sectional view of the structural assembly of FIG. 22 during the application of heat and pressure to the composite base member causing absorption of resin into the permeable material of the radius filler element.

Referring to FIG. 23, shown is a cross-sectional view of the structural assembly 120 illustrating the application of heat 314 and compaction pressure 312 to the structural assembly 120. Compaction pressure 312 may be applied via the drawing of vacuum pressure on the vacuum bag 306 via the vacuum source 310. The application of compaction pressure 312 may consolidate the composite base member 122 and facilitate outgassing, eliminate voids, and increase the fiber volume fraction of the composite base member 122. Heat 314 may be applied using any one of a variety of different mechanisms including, but not limited to, forced air heating, convection heating, induction heating, radiation heating, or other types of heating. The application of heat 314 may reduce the viscosity of the resin 190 in the prepreg composite material 125. The reduction in resin 190 viscosity facilitates the performance of step 504 of the method 500 which includes absorbing resin 190 from the composite base member 122 into the permeable material 202 of the radius filler element 200 as shown in FIG. 25. As mentioned above, the method may include heating the composite base member 122 to reduce the resin 190 viscosity in the prepreg composite material 125 to a liquid or near-liquid state. The heating of the resin 190 may promote intermingling of the resin 190 between the composite plies 124 of the composite base member 122. The application of compaction pressure 312 may also facilitate the intermingling of the resin 190 within the structural assembly 120 and the absorption of resin 190 into the permeable material 202 of the radius filler element 200. The resin 190 may be absorbed by the radius filler element 200 until the permeable material 202 is substantially completely (e.g., at least 90 percent of the volume) impregnated with resin 190. In one example, the resin 190 may be absorbed into the radius filler element 200 until the resin 190 extends throughout the thickness of the radius filler element 200.

Figure 28:
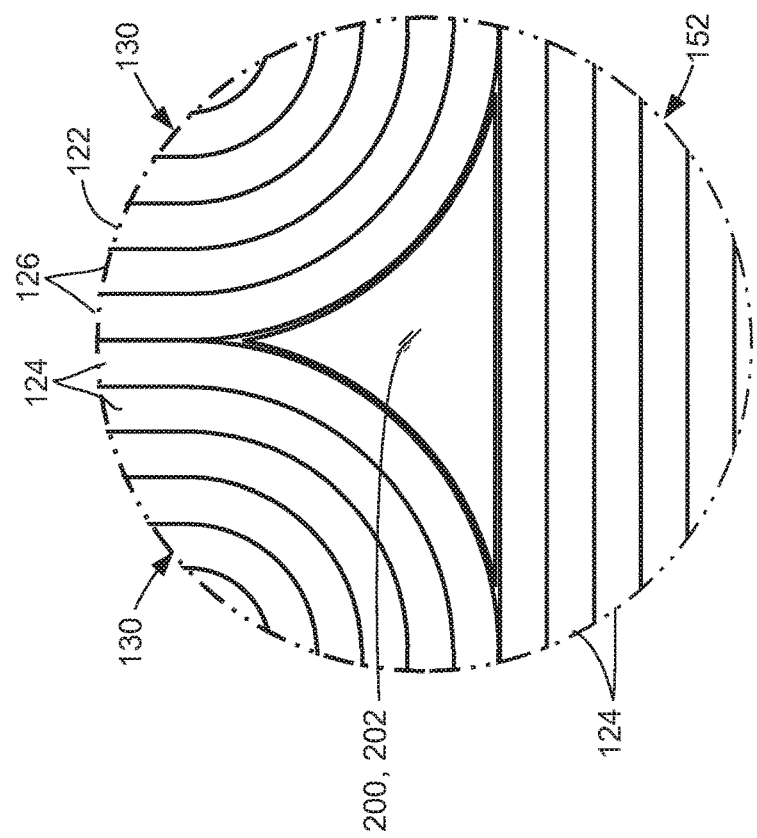
FIG. 28 is a magnified view of the continuous radius filler element in FIG. 26 prior to the heating of the composite base member and prior to the absorption of resin into the permeable material of the radius filler element.

Referring to FIGS. 26-29, shown in FIG. 26 is a cross-sectional view of an example of a structural assembly 120 in which the composite base member 122 is formed of dry fiber material 126. The structural assembly 120 is shown vacuum bagged to a cure tool 300 in an arrangement similar to the above-described arrangement of FIGS. 22-23. However, the arrangement of FIG. 26 is configured for vacuum-assisted resin transfer molding (VARTM) for drawing resin 190 from the resin container 302 and into the dry fiber material 126 of the composite base member 122 in a wet layup process. The arrangement may include one or more infusion ports 316 coupled to the vacuum bag 306 for attaching a corresponding quantity of infusion conduits 318 fluidly connected to the resin container 302. Similar to the above-described arrangement shown in FIGS. 22-23, the arrangement of FIGS. 26-27 may be positioned in an autoclave for resin infusion and curing or solidification of the structural assembly 120, or the structural assembly 120 may be infused and cured or solidified in an out-of-autoclave process. FIG. 28 is a magnified view of the continuous radius filler element 200 of FIG. 26 prior to the infusion of resin 190 into the composite base member 122 and prior to the absorption of resin 190 into the permeable material 202 of the radius filler element 200.

Figure 29:
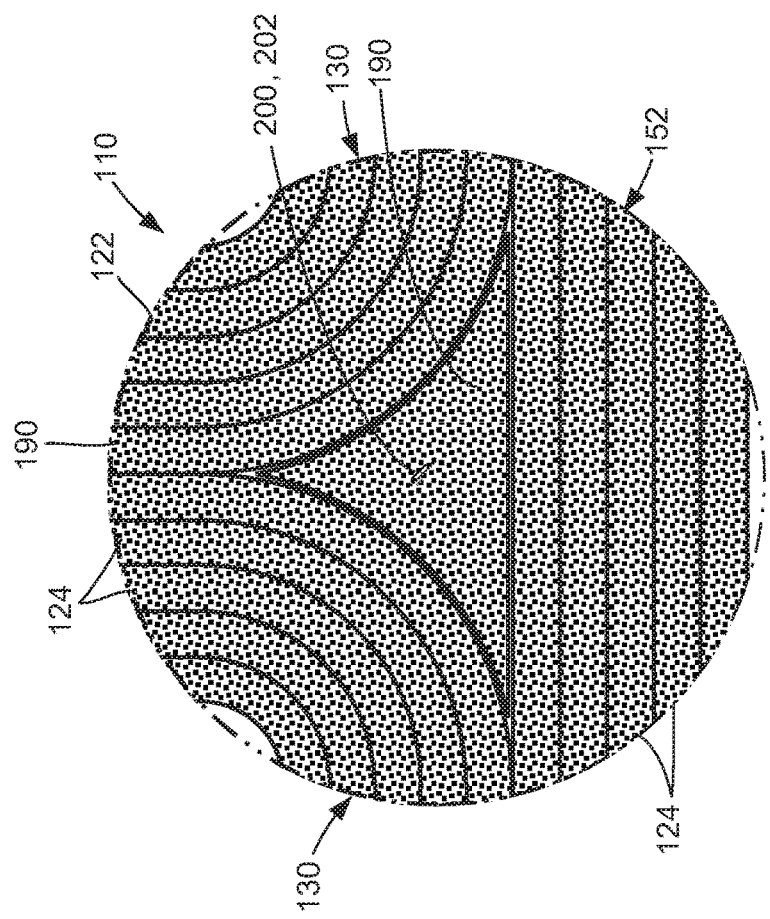
FIG. 29 is a magnified view of the continuous radius filler element in FIG. 27 after the absorption of resin into the permeable material of the radius filler element.

FIG. 27 is a cross-sectional view of the structural assembly 120 of FIG. 26 showing the application of vacuum pressure on the vacuum bag 306 via the vacuum source 310 for applying compaction pressure 312 to the structural assembly 120. Also shown is the vacuum-assisted drawing of resin 190 from the resin container 302 into the structural assembly 120 for infusion of resin 190 into the composite base member 122. In this regard, the method may include infusing the resin 190 into the dry fiber material 126 until substantially uniformly distributed throughout the composite base member 122 and into the permeable material 202 of the radius filler element 200. The resin 190 may be infused until wet-out of the dry fiber material 126 is achieved. FIG. 29 shows the radius filler element 200 after the absorption of resin 190 into the permeable material 202. The method may include the application of heat 314 as may be required for curing the structural assembly 120. As mentioned above, the resin 190 may be a thermosetting resin or a thermoplastic resin. Thermosetting resin may be provided in a liquid state at room temperature. To facilitate curing, the resin 190 may optionally be heated from ambient temperature (e.g., room temperature of 68° F.) to a consolidation temperature and/or to a cure temperature at which the thermosetting resin starts to cross-link and polymerize.

In some examples, thermosetting resin may be cured in a multi-stage curing process in which the thermosetting resin is heated from ambient temperature to a first temperature (e.g., an intermediate temperature) and which is held for a first hold period to allow for consolidation and outgassing of the composite base member 122 during a first stage of the multi-stage curing process. Following the first hold period, the method may further include heating the composite base member 122 from the first temperature to a second temperature which may be the cure temperature of the thermosetting resin. The second temperature may be held for a second hold period during a second stage of the multi-stage curing process. The second stage may allow the thermosetting resin to cure to form the cured composite structure 110 which may then be actively and/or passively cooled back down to room temperature. In a specific example of a two-stage curing process in which the resin 190 is a thermosetting resin, during the first stage, a structural assembly 120 may be heated to a first temperature of from 260-290° F. for a first hold period of 170-190 minutes. During the second stage, the structural assembly 120 may be heated from the first temperature to a second temperature of from 340-370° F. for a second hold period of 80-100 minutes. In a preferred example, during the first stage, the first temperature may be in the range of 270-280° F. for a first hold period of 175-185 minutes. During the second stage, the second temperature may be in the range of 350-360° F. for a second hold period of 85-95 minutes.

For examples where the structural assembly 120 is infused with thermoplastic resin, the application of heat 314 may be required to reduce the viscosity of the thermoplastic resin in the resin container 302 to a liquid state to allow for vacuum-assisted drawing of the thermoplastic resin from the resin container 302 into the composite base member 122. Heat 314 may also be applied to the structural assembly 120 to facilitate resin 190 infusion and wet-out of the dry fiber material 126 of the composite base member 122 and absorption into the permeable material 202 of the radius filler element 200. Although the infusion of resin 190 into the composite base member 122 in FIGS. 26-27 is described in the context of vacuum-assisted resin transfer molding (VARTM), the step of infusing resin 190 into the composite base member 122 may be performed using any one a variety of mechanisms including, but not limited to conventional resin transfer molding, resin film infusion, bulk resin infusion, and other mechanisms. Furthermore, although the present examples illustrate the structural assembly 120 supported on a one-sided mold such as a cure tool 300, the structural assembly 120 may be cured in a closed mold which may include two (2) cure tools (not shown) assembled together and encapsulating the structural assembly 120.

Referring to FIGS. 25 and 29, step 506 of the method 500 includes curing or solidifying the resin 190 in the permeable material 202 of the radius filler element 200 and in the composite base member 122 of the uncured structural assembly 120 to form a cured composite structure 110 in which the resin 190 bonds the radius filler element 200 to the composite base member 122. As mentioned above, curing of thermosetting material may be initiated by applying heat 314 and/or a catalyst or a hardener to initiate polymerization (i.e., crosslinking) of the thermosetting resin. In some examples, curing may be facilitated by applying radiation (e.g., electron-beam, x-ray, microwave, ultraviolet). The curing step may involve the application of compaction pressure 312 for consolidating the uncured structural assembly 120. For a thermoplastic resin, the structural assembly 120 may be passively or actively cooled (e.g., to room temperature) to solidify the thermoplastic resin and result in the cured composite structure 110. As mentioned above, the resin 190 when cured or solidified results in the structural integration of the radius filler element 200 with the composite base member 122 along the side surface interfaces 210. The resin 190 may generate a blended bondline along the side surface interfaces 210. The blended bondline between the radius filler element 200 and the composite base member 122 significantly reduces the propensity for cracks to develop in the bondline, which results in a significant improvement in the strength and durability of the cured composite structure 110.

Figure 30:
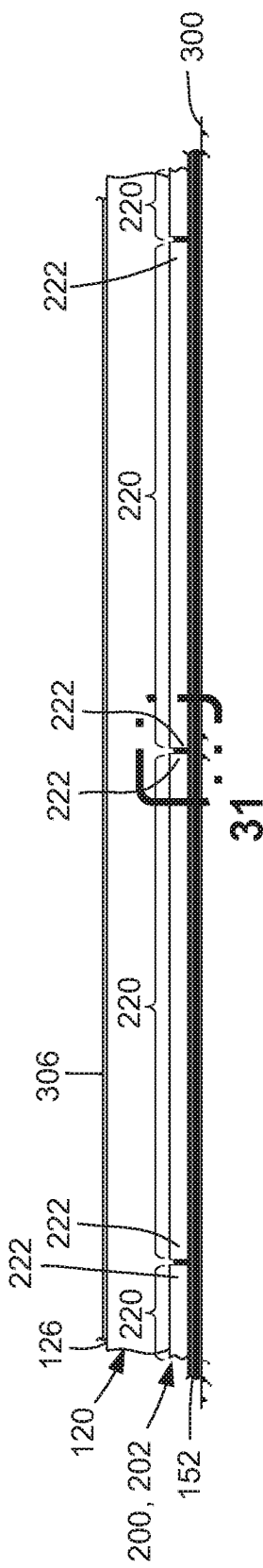
FIG. 30 is a side sectional view of the structural assembly of FIG. 27 and illustrating a plurality of radius filler segments in end-to-end arrangement captured between the composite base member and the composite strip.
Figure 31:
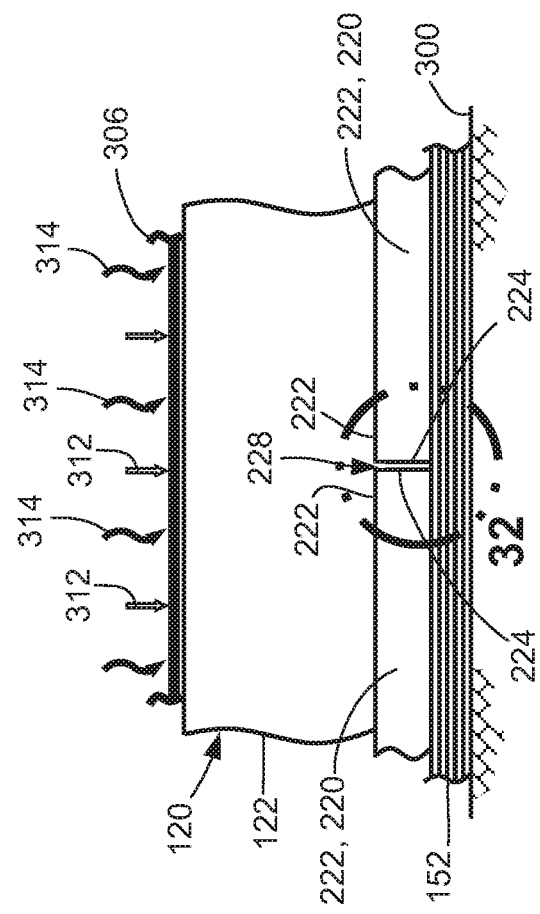
FIG. 31 is a magnified view of the portion of FIG. 30 identified by reference numeral 31 and illustrating the segment ends of a pair of end-to-end radius filler segments defining an end-to-end interface.
Figure 32:
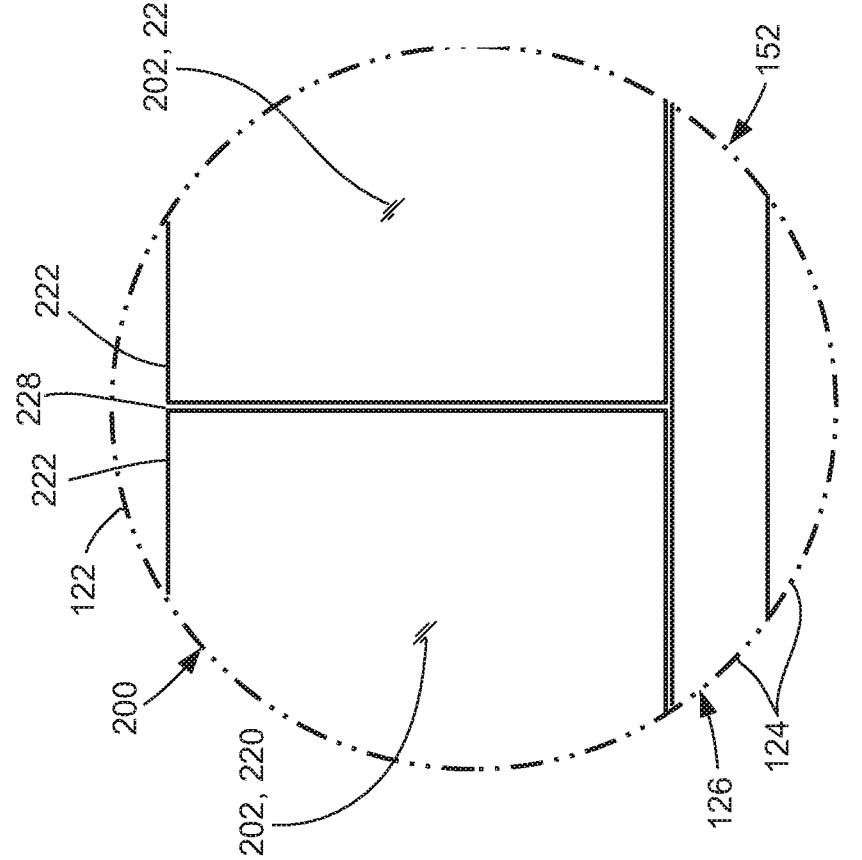
FIG. 32 is a magnified view of the portion of FIG. 31 identified by reference numeral 32 and illustrating the segment ends of a pair of end-to-end radius filler segments prior to resin infusion into the composite base member and absorption of resin into the permeable material of the radius filler element.

Referring to FIGS. 30-33, shown in FIG. 30 is a side sectional view of the structural assembly 120 of FIG. 27 in which the radius filler element 200 is comprised of a plurality of radius filler segments 220 in end-to-end arrangement similar to the above-describe example shown in FIGS. 20-21. In FIG. 30, the radius filler segments 220 are captured between the composite base member 122 and a composite strip 152 which is supported on a cure tool 300 as shown in FIG. 27. FIG. 31 is a magnified view of the portion of the structural assembly 120 showing the segment ends 222 of a pair of end-to-end radius filler segments 220 defining an end-to-end interface 228. A vacuum bag 306 covering the structural assembly 120 is sealed to the cure tool 300, and compaction pressure 312 and heat 314 may be applied during the infusion of resin 190 into the dry fiber material 126 of the composite base member 122. FIG. 32 is a magnified view of the portion of FIG. 31 showing the segment ends 222 of a pair of end-to-end radius filler segments 220 prior to resin infusion into the composite base member 122 and absorption of resin 190 into the permeable material 202 of the radius filler element 200.

Figure 33:
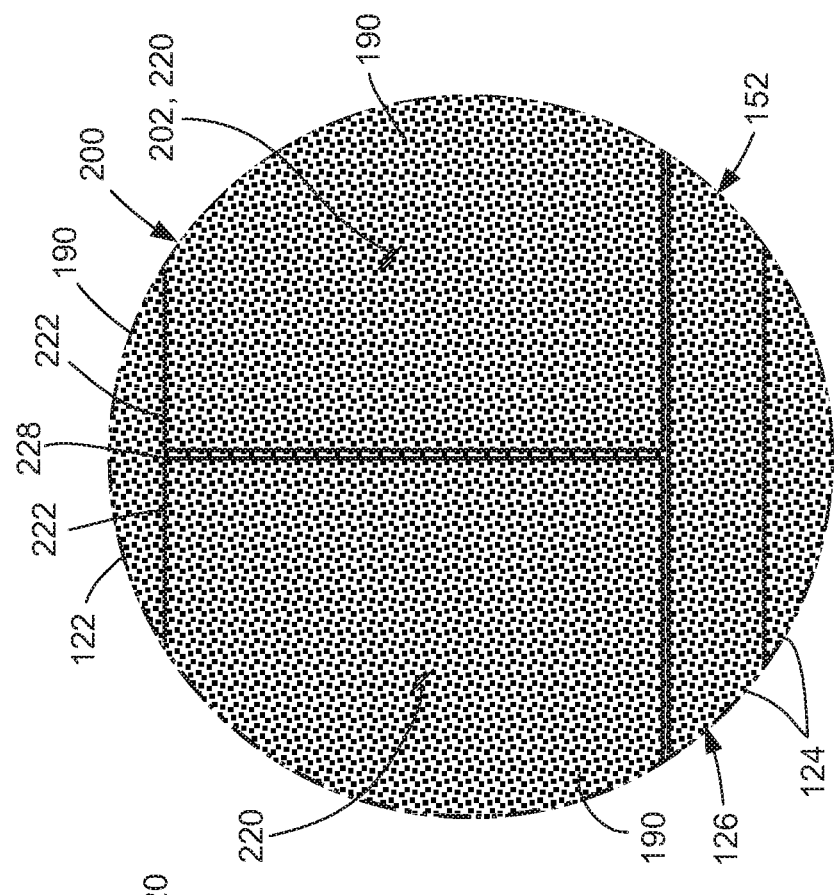
FIG. 33 shows the segment ends of the end-to-end radius filler segments of FIG. 32 after the infusion of resin into the composite base member and the absorption of resin into the permeable material of the radius filler element.

For the arrangement shown in FIGS. 30-33, the above-described step 504 of absorbing the resin 190 into the radius filler element 200 may further include drawing the resin 190 between the segment ends 222 of end-to-end pairs of the plurality of radius filler segments 220 as shown in FIG. 33. The above-described step 506 of curing or solidifying the resin 190 respectively may further include curing or solidifying the resin 190 between the segment ends 222 and bonding together the radius filler segments 220 to form a continuous radius filler element 200 that extends along the length of the composite base member 122. The process of bonding together the segment ends 222 of the radius filler segments 220 may be similar to the above-described manner in which the resin 190 bonds the radius filler side surfaces 204 to the composite base member 122 as shown in FIGS. 25 and 29. The bond between the segment ends 222 may be a blended bondline at each end-to-end interface 228. The blended bondline may have a reduced propensity for cracks that may otherwise develop in the composite base member 122 at the location of the segment ends 222.

Referring to FIG. 34, shown is an example of an uncured structural assembly 120 (e.g., a composite stringer 114) comprising a composite base member 122 containing a radius filler element 200 formed of permeable material 202. FIG. 35 shows an example of a cured composite structure 110 produced by co-curing or co-solidifying a plurality of structural assemblies 120 of FIG. 34 with a composite skin panel 150. Although not shown, the cured composite structure 110 of FIG. 35 may be produced by vacuum bagging a composite skin panel 150 and a plurality of structural assemblies 120 to a cure tool 300. The composite skin panel 150 and the composite base members 122 of the structural assemblies 120 may be either formed of dry fiber material 126 (FIG. 22) or prepreg composite material 125 (FIG. 26). The composite skin panel 150 and structural assemblies 120 may be processed in a manner as described above to facilitate the absorption of resin 190 from the composite base member 122 into the permeable material 202 of the radius filler element 200, and the curing or solidifying of the resin 190 to bond the radius filler element 200 to the composite base member 122 and thereby form a cured composite structure 110. As mentioned above, FIG. 35 illustrates one example of a cured composite structure 110 that may be manufactured using the above-described method. However, a cured composite structure 110 may be part of any one of a variety of different types of structures, systems and/or vehicles. In the context of an aircraft 100 shown in FIGS. 1-2, the cured composite structure 110 may be a composite stringer 114 or a composite spar 116, or any one of a variety of other aircraft 100 components. In some examples, the cured composite structure of the aircraft may include a radius filler element formed of leather.

Figure 37:
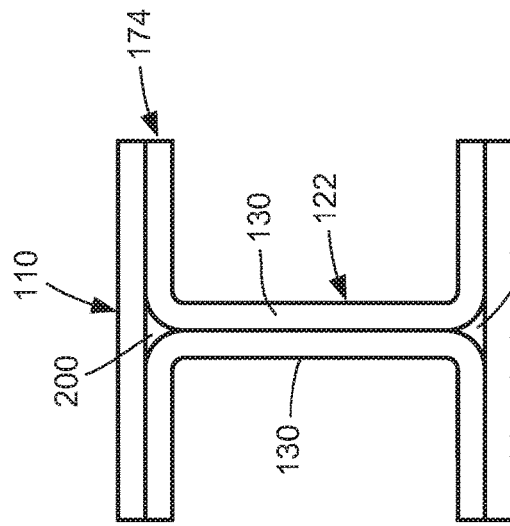
FIG. 37 is a sectional view of an example of a cured composite structure containing a radius filler element and configured in an I-shaped cross-section.
Figure 38:
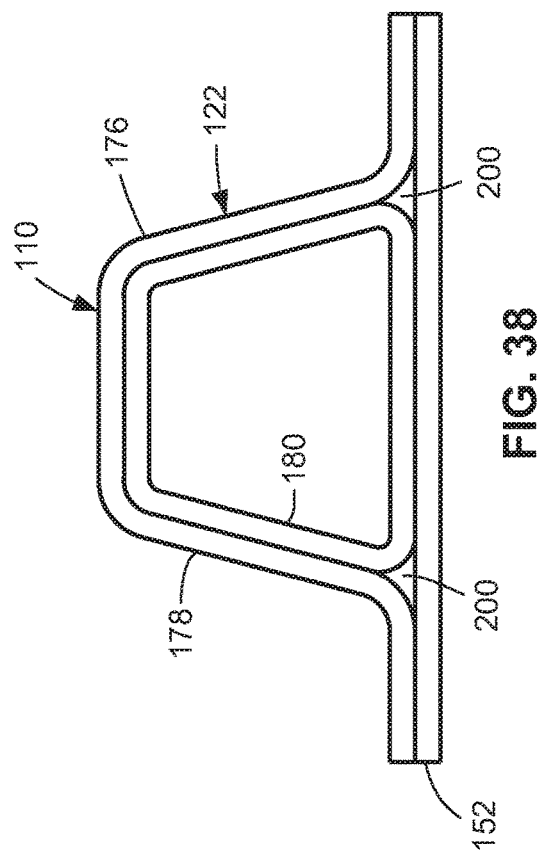
FIG. 38 is a sectional view of an example of a cured composite structure containing a radius filler element and configured in a hat-shaped cross-section.
Figure 36:
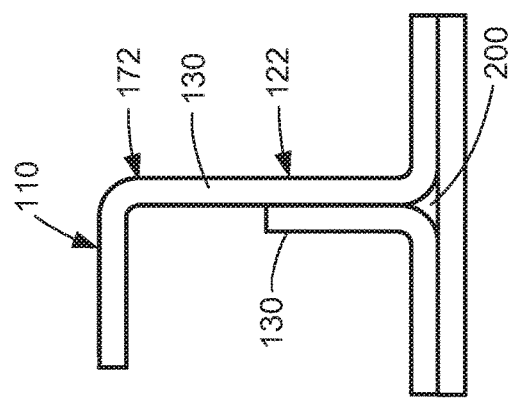
FIG. 36 is a sectional view of an example of a cured composite structure containing a radius filler element and configured in a J-shaped cross-section.

FIGS. 36-38 show non-limiting examples of different cross-sectional configurations of cured composite structures 110 produced by using different cross sections of composite channels 130 for the composite base member 122. For example, FIG. 36 shows an example of a cured composite structure 110 having a J-shaped cross section 172 formed by assembling a Z-shaped composite channel 130 with an L-shaped composite channel 130. FIG. 37 shows an example of a cured composite structure 110 having an I-shaped cross section 174 formed by assembling a pair of C-shaped composite channels 130 in back-to-back relation with each other. FIG. 38 shows an example of a cured composite structure 110 having a hat-shaped cross section 176 formed by assembling a primary laminate 178, a wrap laminate 180, and a composite strip 152 to collectively encapsulate a pair of radius filler elements 200.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a cured composite structure, comprising:
    placing a radius filler element into a radius cavity extending along a length of a composite base member having reinforcing fibers, the radius filler element being a separate component that is non-integral with the composite base member prior to placing in the radius cavity, and being formed of a permeable material devoid of unidirectional reinforcing fibers extending along a lengthwise direction of the radius filler element;
    absorbing resin from the composite base member into the permeable material of the radius filler element, until at least 90 percent of the volume of the permeable material is impregnated with resin; and
    curing or solidifying the resin in the radius filler element and in the composite base member to form a cured composite structure in which the resin bonds the radius filler element to the composite base member.

2. The method of claim 1, wherein the permeable material is at least one of:
    a natural material including at least one of:
        an animal-based material including at least one of leather, silk, and wool;
        a plant-based material including at least one of cotton, linen, jute, and hemp;
    a synthetic material including at least one of:
        woven, felted, or knitted synthetic fibers; and
        open-cell rubber or open-cell foam including polyurethane foam.

3. The method of claim 1, wherein the composite base member is comprised of one or more composite plies of composite prepreg material having reinforcing fibers pre-impregnated with resin, the method further including:
    heating the composite base member to reduce a viscosity of the resin for absorption into the permeable material of the radius filler element.

4. The method of claim 1, wherein the composite base member is comprised of dry fiber material having reinforcing fibers, the method further including:
    infusing the resin into the dry fiber material and the permeable material of the radius filler element.

5. The method of claim 1, wherein the steps of placing the radius filler element into the radius cavity, absorbing the resin into the radius filler element, and curing or solidifying the resin respectively further include:
    inserting a plurality of radius filler segments into the radius cavity, the plurality of radius filler segments each having opposing segment ends and being in end-to-end arrangement within the radius cavity;
    drawing the resin between the segment ends of end-to-end pairs of the plurality of radius filler segments; and
    curing or solidifying the resin between the segment ends and bonding together the radius filler segments and forming the radius filler element.

6. The method of claim 5, wherein inserting the plurality of radius filler segments in end-to-end arrangement within the radius cavity comprises:
    inserting the radius filler segments into the radius cavity such that end surfaces of adjacent radius filler segments are within 0.010 inch of each other.

7. The method of claim 1, wherein:
    the composite base member comprises two composite components in back-to-back relation to each other forming the radius cavity.

8. The method of claim 7, further comprising:
    drawing the resin between the back-to-back radius filler halves to result in bonding the radius filler halves together upon curing or solidifying of the resin.

9. The method of claim 7, wherein:
    each composite component has an L-shaped configuration.

10. The method of claim 7, wherein:
    each composite component is a composite channel having a web portion and a flange portion, interconnected by a radiused web-flange transition; and
    when the composite channels are assembled in back-to-back relationship, the web-flange transitions of the composite channels define the radius cavity.

11. The method of claim 1, wherein the method includes:
    providing an unformed radius filler having a cross-sectional shape that is different than the cross-sectional shape of the radius cavity; and
    forming the unformed radius filler into a cross-sectional shape that approximately matches the cross-sectional shape of the radius cavity to define the radius filler element.

12. The method of claim 1, wherein the method includes:
    providing a pair of unformed radius filler halves each having a triangularly-shaped cross section in an undeformed state that is different than the cross-sectional shape of the radius cavity, each unformed radius filler half having a filler half base surface and opposing filler half side surfaces intersecting at a filler half apex, the filler half base surface having opposing filler half base edges;
    forming each unformed radius filler half into a formed radius filler half by bending the opposing filler half base edges of each unformed radius filler half away from the filler half apex until the filler half side surfaces define an approximate right angle and the filler half base surface assumes a concave shape; and
    assembling a pair of the formed radius filler halves in back-to-back relation to each other to define the radius filler element.

13. The method of claim 12, wherein:
    when each radius filler half is in the undeformed state, the triangularly-shaped cross-section of the radius filler half is symmetrical about a line perpendicular to the planar filler half base surface.

14. The method of claim 12, wherein:
    when each radius filler half is in the undeformed state, the filler half base surface has a length that is at least twice the height of the triangularly-shaped cross-section; and
    the height of the triangularly-shaped cross-section is measured perpendicularly from the filler half base surface to the filler half apex.

15. The method of claim 12, wherein:
the radius cavity has opposing radius cavity surfaces; and
the concave shape assumed by each filler half base surface when bending each radius filler half approximates the curvature of the radius cavity surfaces.

16. The method of claim 12, wherein:
each one of the radius filler halves is formed of leather.

17. The method of claim 1, wherein:
the resin comprises one of thermosetting resin and thermoplastic resin;
 the thermoplastic resin comprises one of the following: acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material, acrylics, fluorocarbons, polyamides, polyolefins, polyesters, polycarbonates, polyurethanes, polyetherimides, polyethersulfone, polysulfone, polystyrene, and polyphenylsulfone; and
 the thermosetting resin comprises one of the following: polyurethanes, phenolics, polyimides, sulphonated polymer, a conductive polymer, benzoxazines, bismaleimides, cyanate esthers, vinyl esters, polyesters, epoxies, and silsesquioxanes; and
 the reinforcing fibers of the composite base member are formed of at least one of the following materials: plastic, glass, ceramic, carbon, metal, or any combination thereof.

18. The method of claim 1, further comprising:
assembling one of a composite strip or a composite skin panel to the composite base member in a manner encapsulating the radius filler element between the composite base member and the composite strip or composite skin panel.

19. The method of claim 1, further comprising:
manufacturing the radius filler element by one of casting, pressing, die extrusion, machining, three-dimensional printing, or assembling.

20. The method of claim 1, wherein:
the composite base member is comprised of composite plies.

21. The method of claim 20, wherein:
the composite plies are comprised of one of fiberglass/epoxy, carbon/epoxy, carbon/bismaleimide, and fiberglass/phenolic.

22. A method of manufacturing a cured composite structure, comprising:
placing a radius filler element into a radius cavity extending along a length of a composite base member having reinforcing fibers, the radius filler element being a separate component that is non-integral with the composite base member prior to placing in the radius cavity, and being formed of a permeable material devoid of unidirectional reinforcing fibers extending along a lengthwise direction of the radius filler element, wherein the permeable material is at least one of:
 a natural material including at least one of:
  an animal-based material including at least one of leather, silk, and wool;
  a plant-based material including at least one of cotton, linen, jute, and hemp;
 a synthetic material including at least one of:
  woven fibers, felted fibers, knitted synthetic fibers; and
  open-cell rubber;
absorbing resin from the composite base member into the permeable material of the radius filler element; and
curing or solidifying the resin in the radius filler element and in the composite base member to form a cured composite structure in which the resin bonds the radius filler element to the composite base member.

* * * * *